(12) United States Patent
Schultze et al.

(10) Patent No.: US 10,848,431 B2
(45) Date of Patent: *Nov. 24, 2020

(54) VIRTUAL NETWORK INTERFACE OBJECTS

(71) Applicant: Amazon Technologies, Inc., Seattle, WA (US)

(72) Inventors: Eric W. Schultze, Bellevue, WA (US); Aaron C. Thompson, Seattle, WA (US); Arijit Ganguly, Kirkland, WA (US); Padmini C. Iyer, Redmond, WA (US); Tobias L. Holgers, Seattle, WA (US); Christopher J. Lefelhocz, Bothell, WA (US); Ian Roger Searle, Bellevue, WA (US)

(73) Assignee: Amazon Technologies, Inc., Seattle, WA (US)

( * ) Notice: Subject to any disclaimer, the term of this patent is extended or adjusted under 35 U.S.C. 154(b) by 0 days.

This patent is subject to a terminal disclaimer.

(21) Appl. No.: 16/523,143

(22) Filed: Jul. 26, 2019

(65) Prior Publication Data

US 2020/0021534 A1 Jan. 16, 2020

Related U.S. Application Data

(63) Continuation of application No. 15/179,739, filed on Jun. 10, 2016, now Pat. No. 10,367,753, which is a
(Continued)

(51) Int. Cl.
*H04L 12/24* (2006.01)
*H04L 12/911* (2013.01)
(Continued)

(52) U.S. Cl.
CPC .............. *H04L 47/70* (2013.01); *H04L 41/00* (2013.01); *H04L 41/50* (2013.01);
(Continued)

(58) Field of Classification Search
CPC ....... G06F 9/45558; G06F 2009/45562; G06F 2009/4557; G06F 9/45533; G06F 11/1484; H04L 67/10; H04L 47/781
See application file for complete search history.

(56) References Cited

U.S. PATENT DOCUMENTS 6,883,065 B1 4/2005 Pittelkow et al.
7,174,455 B1 2/2007 Arnold et al.
(Continued)

FOREIGN PATENT DOCUMENTS

CN 102598591 7/2012
JP 2002368763 12/2002
JP 2004264911 9/2004

OTHER PUBLICATIONS

Brazilian Search Report in Application No. BR112014011892-2, (English translation and Brazilian version), (Amazon Technologies, Inc), dated Nov. 16, 2020, pp. 1-7.
(Continued)

*Primary Examiner* — Hitesh Patel
(74) *Attorney, Agent, or Firm* — Robert C. Kowert; Kowert, Hood, Munyon, Rankin & Goetzel, P.C.

(57) ABSTRACT

Methods and apparatus for interfaces to manage virtual network interface objects. A system may include resource instances and a network interface virtualization coordinator. Responsive to a record creation request, the coordinator creates an interface records that may include an IP address, subnet information and security properties. The coordinator may, in response to a request to attach the record to a resource instance, enable traffic directed to the IP address to flow to the resource instance. In response to a subsequent detach request, the traffic to the IP address may be disabled at the resource instance. The same interface record may be attached to another resource instance in response to another
(Continued)

attach request, enabling traffic directed to the IP address to flow to the second resource instance.

19 Claims, 12 Drawing Sheets

Related U.S. Application Data continuation of application No. 14/517,568, filed on Oct. 17, 2014, now Pat. No. 9,369,403, which is a continuation of application No. 13/339,985, filed on Dec. 29, 2011, now Pat. No. 8,868,710.

(60) Provisional application No. 61/561,675, filed on Nov. 18, 2011.

(51) Int. Cl.
*H04L 29/12* (2006.01)
*H04L 29/06* (2006.01)

(52) U.S. Cl.
CPC ...... *H04L 41/5045* (2013.01); *H04L 41/5051* (2013.01); *H04L 61/2007* (2013.01); *H04L 61/6068* (2013.01); *H04L 63/20* (2013.01); *H04L 61/304* (2013.01)

(56) References Cited

U.S. PATENT DOCUMENTS

| | | | |
|---|---|---|---|
| 7,383,433 | B2 | 6/2008 | Yeager et al. |
| 7,440,415 | B2 | 10/2008 | Wild, III et al. |
| 7,502,884 | B1* | 3/2009 | Shah .................. H04L 67/1097 370/395.21 |
| 7,630,368 | B2 | 12/2009 | Tripathi et al. |
| 7,634,584 | B2 | 12/2009 | Pope et al. |
| 7,733,890 | B1 | 6/2010 | Droux et al. |
| 7,792,140 | B2 | 9/2010 | Droux et al. |
| 7,912,082 | B2 | 3/2011 | Yang et al. |
| 7,961,726 | B2 | 6/2011 | Wang et al. |
| 7,962,950 | B2 | 6/2011 | Choo et al. |
| 7,984,066 | B1 | 7/2011 | Kilday et al. |
| 8,259,597 | B1 | 9/2012 | Oak |
| 8,484,089 | B1 | 7/2013 | Lin et al. |
| 8,868,710 | B2 | 10/2014 | Schultze et al. |
| 9,369,403 | B2 | 6/2016 | Schultze et al. |
| 9,916,545 | B1 | 3/2018 | de Kadt et al. |
| 2002/0026592 | A1 | 2/2002 | Gavrila et al. |
| 2002/0106985 | A1 | 8/2002 | Sato et al. |
| 2003/0053441 | A1 | 3/2003 | Banerjee |
| 2004/0078371 | A1 | 4/2004 | Worrall et al. |
| 2004/0162914 | A1 | 8/2004 | St. Pierre et al. |
| 2005/0120160 | A1 | 6/2005 | Plouffe et al. |
| 2005/0198384 | A1 | 9/2005 | Ansari et al. |
| 2006/0262736 | A1 | 11/2006 | Dong et al. |
| 2008/0002703 | A1 | 1/2008 | Tripathi et al. |
| 2008/0104393 | A1 | 5/2008 | Glasser et al. |
| 2008/0225875 | A1 | 9/2008 | Wray et al. |
| 2008/0267087 | A1 | 10/2008 | Beck et al. |
| 2009/0129385 | A1 | 5/2009 | Wray et al. |
| 2009/0190585 | A1 | 7/2009 | Allen et al. |
| 2009/0205018 | A1 | 8/2009 | Ferraiolo et al. |
| 2009/0288084 | A1 | 11/2009 | Astete et al. |
| 2010/0049637 | A1 | 2/2010 | Laventman et al. |
| 2010/0094990 | A1 | 4/2010 | Ben-Yehuda et al. |
| 2010/0131949 | A1 | 5/2010 | Ferris |
| 2010/0132012 | A1 | 5/2010 | van Riel et al. |
| 2010/0132016 | A1 | 5/2010 | Ferris |
| 2010/0214949 | A1 | 8/2010 | Smith et al. |
| 2010/0257276 | A1 | 10/2010 | Savolainen |
| 2011/0022694 | A1 | 1/2011 | Dalal et al. |
| 2011/0047540 | A1 | 2/2011 | Williams et al. |
| 2011/0072486 | A1 | 3/2011 | Hadar et al. |
| 2011/0072487 | A1 | 3/2011 | Hadar et al. |
| 2011/0087888 | A1 | 4/2011 | Rennie |
| 2011/0099616 | A1 | 4/2011 | Mazur et al. |
| 2011/0137947 | A1 | 6/2011 | Dawson et al. |
| 2011/0251937 | A1 | 10/2011 | Falk et al. |
| 2011/0251992 | A1 | 10/2011 | Bethlehem et al. |
| 2011/0255538 | A1 | 10/2011 | Srinivasan et al. |
| 2011/0264906 | A1 | 10/2011 | Pourzandi et al. |
| 2012/0185913 | A1* | 7/2012 | Martinez ............. G06F 9/45558 726/1 |
| 2012/0278802 | A1 | 11/2012 | Chandrasekharan et al. |
| 2013/0145072 | A1 | 6/2013 | Venkataraghavan et al. |
| 2013/0151646 | A1 | 6/2013 | Chidambaram et al. |
| 2018/0197122 | A1* | 7/2018 | de Kadt ................ G06Q 10/06 |

OTHER PUBLICATIONS

Office Action from Chinese Application No. 201710229354.7, (English translation and Chinese version), (Amazon Technologies, Inc.), dated Jul. 24, 2019, pp. 1-24.
Office Action from Japanese Application No. 2018-195769, (English Translation and Japanese Version), dated Aug. 13, 2019, pp. 1-9.
HideharuMatsubara, "Introduction to Programming for Practical Use of the Cloud, from the Basics of Amazon EC2/S3 to Intracompany Cloud Operation Design", Software Design, vol. 240, Japan, Gijutsu-Hyohron Co., Ltd., 2011, pp. 34-39, (Japanese Version Only).
Ken Tamagawa, "Amazon Web Services Enterprise Support that has finally begun", G-CLoud Magazine 2011 Autumn, Japan, Gijutsu-Hyohron Co. Ltd., 2011, pp. 34-39, (Japanese Version Only).
Extended European Search Report in Application No. 12850123.6-1862/2780818, dated Jun. 1, 2015, pp. 1-8.
Hemal Shah, "DMTF Management Standards for Edge Virtual Bridging (EVB) and Network Port Profiles", Mar. 31, 2011, Retrieved from the Internet: URL:http://web.archive.org/web/20110805234700/ http://www.ieee802.org/1/fi- les/public/docs2011/bg-shah-dmtf-evbportprofile-overview-0311. pdf, pp. 7-21.
Office Action from Russian Application No. 2014120221/08, dated Oct. 2, 2015 (English Translation and Russian Version), Amazon Technologies, Inc., pp. 1-7.
U.S. Appl. No. 13/339,985, filed Dec. 29, 2011, Eric W. Schultze.
U.S. Appl. No. 13/408,902, filed Feb. 29, 2012, Christopher Richard Jacques de Kadt.
U.S. Appl. No. 13/525,010, filed Jun. 15, 2012, Erik J. Fuller.
International Search Report and Written Opinion in application No. PCT/US 12/65429, dated Jan. 29, 2013 pp. 1-14.
U.S. Appl. No. 13/833,945, filed Mar. 15, 2013, Ian Roger Searle.
U.S. Appl. No. 15/728,277, filed Oct. 9, 2017, Kevin Christopher Miller.
U.S. Appl. No. 14/548,196, filed Nov. 19, 2014, Edward Max Schaefer.
U.S. Appl. No. 15/823,185, filed Nov. 27, 2017, Kevin Christopher Miller.
U.S. Appl. No. 14/658,965, filed Mar. 16, 2015, Weili Zhang Mcclenahan.
U.S. Appl. No. 14/736,165, filed Jun. 10, 2015, Calm Maccarthaigh.
U.S. Appl. No. 16/029,468, filed Jul. 6, 2018, Kyle Tailor Akers.
U.S. Appl. No. 14/853,646, filed Sep. 14, 2015, Po-Chun Chen.
U.S. Appl. No. 16/056,078, filed Aug. 6, 2018, Unknown.
U.S. Appl. No. 15/439,751, filed on Mihir Sadruddin Surani.
U.S. Appl. No. 15/632,258, filed on Benjamin David Strauss.
U.S. Appl. No. 15/435,138, filed Feb. 16, 2017, Daniel Todd Cohn.
U.S. Appl. No. 15/702,589, filed Sep. 12, 2017, Kevin Christopher Miller.
U.S. Appl. No. 14/822,704, filed Aug. 10, 2015, Daniel T. Cohn.
U.S. Appl. No. 14/853,608, filed Sep. 14, 2015, Eric Jason Brandwine.
U.S. Appl. No. 13/829,721, filed Mar. 14, 2013, Eric Jason Brandwine.
U.S. Appl. No. 15/382,403, filed Dec. 16, 2016, Daniel Todd Cohn.
U.S. Appl. No. 15/011,302, filed Jan. 29, 2016, Eric Jason Brandwine.
U.S. Appl. No. 15/996,371, filed Jun. 1, 2018, Eric Jason Brandwine.
U.S. Appl. No. 15/663,592, filed Jul. 28, 2017, Kevin Christopher Miller.
U.S. Appl. No. 14/067,756, filed Oct. 30, 2013, Daniel T. Cohn.
U.S. Appl. No. 15/061,851, filed Mar. 4, 2016, Eric Jason Brandwine.
U.S. Appl. No. 15/154,818, filed May 13, 2016, Eric Jason Brandwine.

(56) References Cited

OTHER PUBLICATIONS

Masahiro Satou, et al., "Server Side Networking for Cloud Data Centers", 2012 IEEE 1st International Conference on Cloud Networking (Cloudnet), Nov. 28, 2012, pp. 17-22.

Kapil Bakshi, "Considerations for Software Defined Networking (SDN): Approaches and Use Cases", Aerospace Conference, 2013 IEEE, Mar. 2, 2013, pp. 1-9.

\* cited by examiner

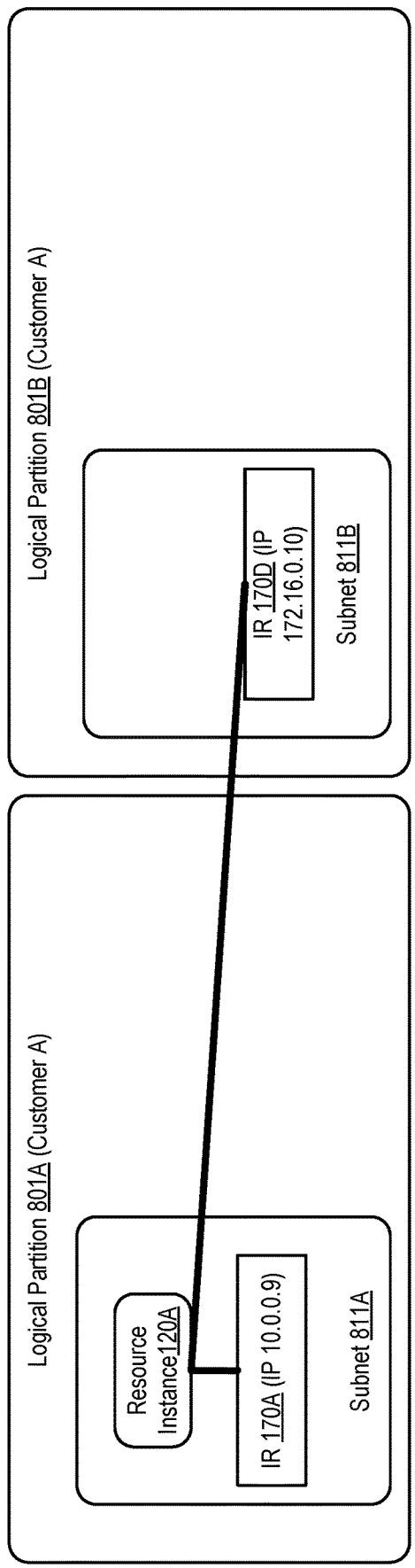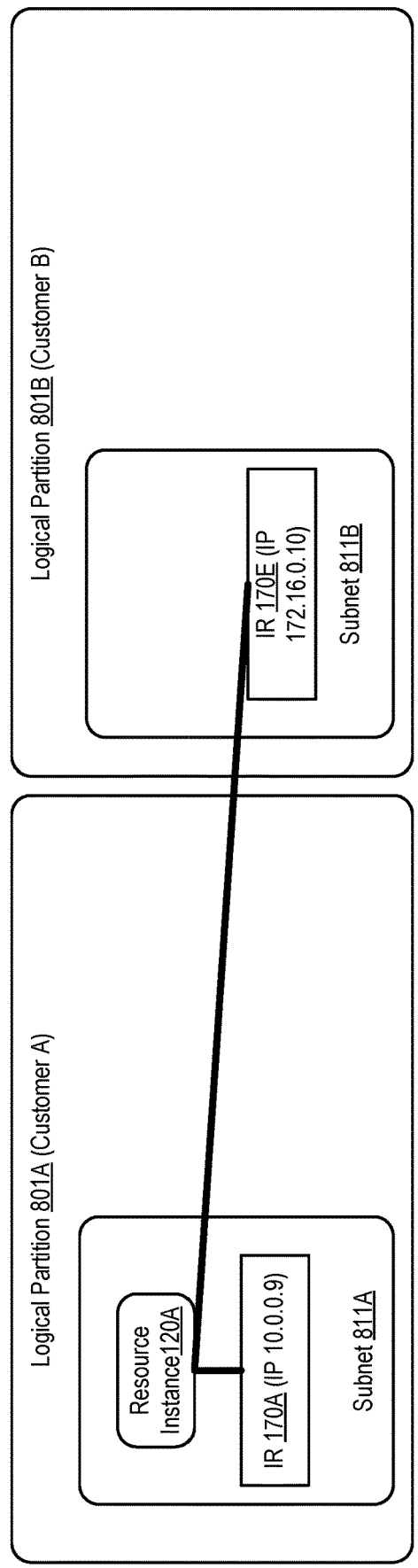

900

Cloud Service Console https://YourFavoriteCloudService.com

Dear John Doe, Welcome to your favorite cloud service!!

You can set up your Virtual Interface Records using ← 903
the fields below. Click here for help.

Interface Name :

Description :
← 904

Logical Partition: ← 905

Subnet: ← 909

IP Address(es): ← 917

Security Properties: ← 921

Resource Instance Id: ← 925

SUBMIT ← 931

*Figure 9*

VIRTUAL NETWORK INTERFACE OBJECTS

PRIORITY INFORMATION

This application is a continuation of U.S. patent application Ser. No. 15/179,739, filed Jun. 10, 2016, which is a continuation of U.S. patent application Ser. No. 14/517,568, filed Oct. 17, 2014, now U.S. Pat. No. 9,369,403, which is a continuation of U.S. patent application Ser. No. 13/339,985, filed Dec. 29, 2011, now U.S. Pat. No. 8,868,710, which claims benefit of priority of U.S. Provisional Application Ser. No. 61/561,675, filed Nov. 18, 2011, which are hereby incorporated by reference herein in their entirety.

BACKGROUND

Many companies and other organizations operate computer networks that interconnect numerous computing systems to support their operations, such as with the computing systems being co-located (e.g., as part of a local network) or instead located in multiple distinct geographical locations (e.g., connected via one or more private or public intermediate networks). For example, data centers housing significant numbers of interconnected computing systems have become commonplace, such as private data centers that are operated by and on behalf of a single organization, and public data centers that are operated by entities as businesses to provide computing resources to customers. Some public data center operators provide network access, power, and secure installation facilities for hardware owned by various customers, while other public data center operators provide "full service" facilities that also include hardware resources made available for use by their customers. However, as the scale and scope of typical data centers has increased, the tasks of provisioning, administering, and managing the physical computing resources have become increasingly complicated.

The advent of virtualization technologies for commodity hardware has provided benefits with respect to managing large-scale computing resources for many customers with diverse needs, allowing various computing resources to be efficiently and securely shared by multiple customers. For example, virtualization technologies may allow a single physical computing machine to be shared among multiple users by providing each user with one or more virtual machines hosted by the single physical computing machine, with each such virtual machine being a software simulation acting as a distinct logical computing system that provides users with the illusion that they are the sole operators and administrators of a given hardware computing resource, while also providing application isolation and security among the various virtual machines. Furthermore, some virtualization technologies are capable of providing virtual resources that span two or more physical resources, such as a single virtual machine with multiple virtual processors that spans multiple distinct physical computing systems. As another example, virtualization technologies may allow data storage hardware to be shared among multiple users by providing each user with a virtualized data store which may be distributed across multiple data storage devices, with each such virtualized data store acting as a distinct logical data store that provides users with the illusion that they are the sole operators and administrators of the data storage resource.

Operators of data centers that provide different types of virtualized computing, storage, and/or other services usually rely on standard networking protocols to receive customer requests and transmit responses to such requests using commodity network hardware such as various types of network interface cards (NICs). Despite recent advances in virtualization technology, many networking-related properties of virtual servers are still typically managed at the level of individual physical network interface cards. As the complexity of the different types of dynamic networking configuration changes demanded by the customers of virtualized services grows, network management at the physical NIC level may become more and more cumbersome.

BRIEF DESCRIPTION OF THE DRAWINGS

FIGS. 8a-8d provide illustrations of a number of example network configurations achievable by attaching interface records to resource instances, according to some embodiments.

FIG. 9 is an illustration of a portion of an exemplary web-based interface that may be provided by a network interface virtualization coordinator, according to at least some embodiments.

Figure 1:
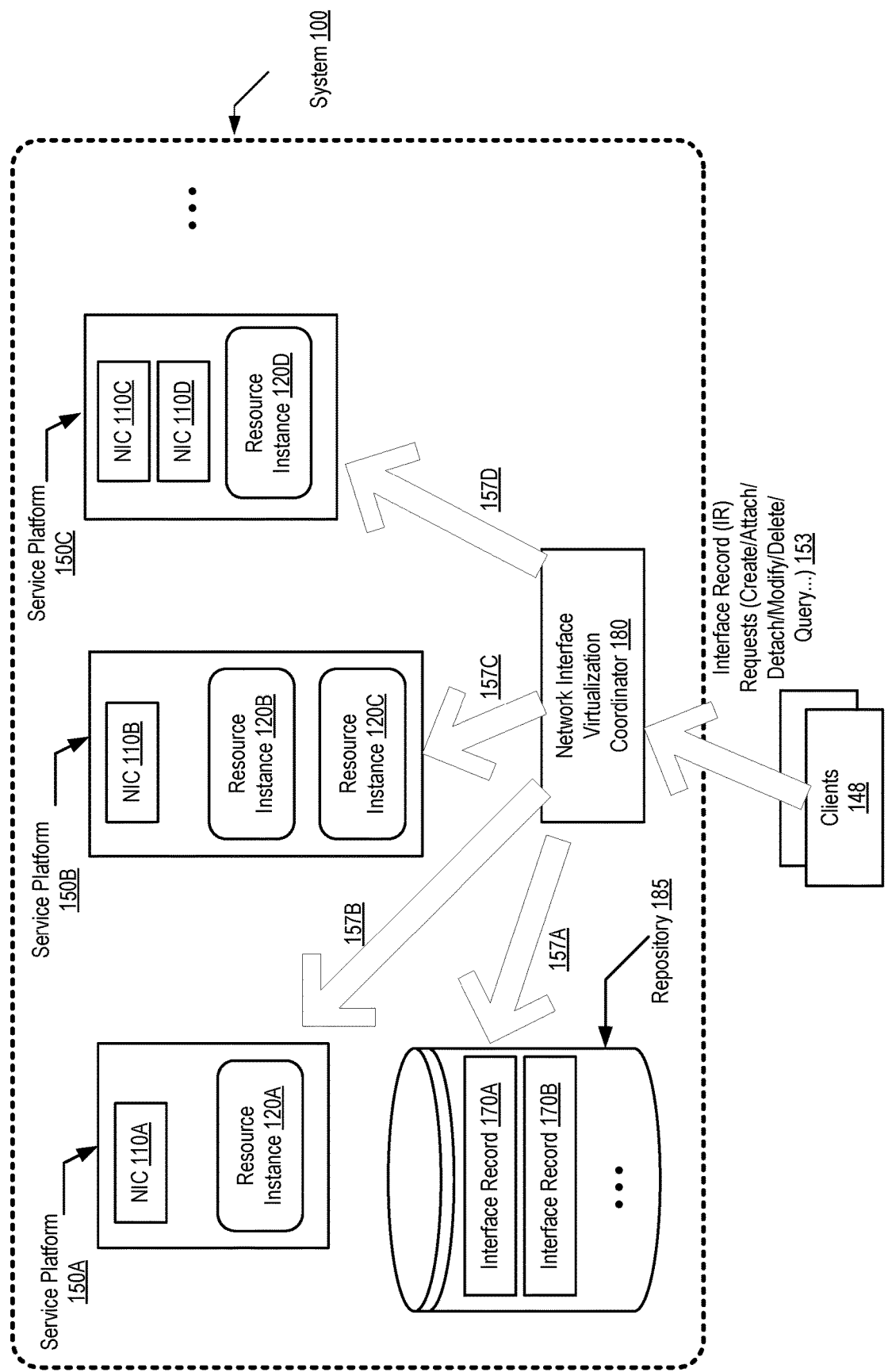
FIG. 1 illustrates an example system environment, according to at least some embodiments.

While embodiments are described herein by way of example for several embodiments and illustrative drawings, those skilled in the art will recognize that embodiments are not limited to the embodiments or drawings described. It should be understood, that the drawings and detailed description thereto are not intended to limit embodiments to the particular form disclosed, but on the contrary, the intention is to cover all modifications, equivalents and alternatives falling within the spirit and scope as defined by the appended claims. The headings used herein are for organizational purposes only and are not meant to be used to limit the scope of the description or the claims. As used throughout this application, the word "may" is used in a permissive sense (i.e., meaning having the potential to), rather than the mandatory sense (i.e., meaning must). Similarly, the words "include," "including," and "includes" mean including, but not limited to.

DETAILED DESCRIPTION OF EMBODIMENTS

Various embodiments of methods and apparatus for managing virtual network interface objects are described. Networks set up by an entity such as a company or a public sector organization to provide one or more services accessible via the Internet (such as various types of cloud-based computing or storage) to a distributed set of clients may be termed provider networks in this document. Such a provider network may include numerous data centers hosting various resource pools, such as collections of physical and virtualized computer servers, storage devices, networking equipment and the like, needed to implement and distribute the services offered by the provider.

For a number of different reasons, for example to greatly enhance the flexibility with which different sets of resources may be accessed without having to resort to cumbersome security setting modifications, reconfiguring and/or physically moving network interface cards, in some embodiments an operator of a provider network may set up a set of virtualization services for network interfaces. Such services may be enabled by a network interface virtualization coordinator (which may also be referred to using the abbreviation "NIVC" in this document) responsible for maintaining, and implementing various operations on, a set of interface records to manage networking operations required to access various resources of the provider network. In some embodiments, different parts of the functionality of the NIVC may be incorporated within several different co-operating software components and/or devices, such as modules of hypervisor or operating system software running on various hardware platforms of the provider network, router software on edge devices, and the like.

In one implementation the provider network may provide customers with numerous instances of virtualized compute resources and/or storage resources, each of which may require network addressability to allow the customers to interact with it. The NIVC in such an implementation may allow a customer to request that a modifiable and transferable interface record be created, which includes various elements of networking configuration information (such as for example security policies, addressing and routing information) that the customer wishes to set up and then associate and disassociate as desired with various resource instances over time. An interface record may in some embodiments include one or more Internet Protocol (IP) addresses and a subnet identifier for a subnet to which the IP address or addresses belong. In addition, various security-related settings may be included in the interface records, identifying for example which entities or users are allowed to perform the "attach" and "detach" operations described in further detail below. The NIVC may create the requested interface record and in one embodiment store it in a persistent repository or database of interface records.

The customer may in some embodiments request that the NIVC "attach" the interface record to a resource instance such as a virtualized compute server or storage server, thereby enabling the resource instance to receive incoming traffic directed at an IP address of the interface record, and enabling outbound traffic from the resource instance to indicate that it originated at that IP address. The network traffic may flow over one or more physical network interface cards (NICs) that happen to be installed at a physical platform on which the virtualized resource instance may currently be instantiated, but the properties of the interface record may be considered to be independent of any particular NIC or NICs, and also independent of any particular resource instance. At a given point in time, for example, an interface record may or may not be associated with (i.e., "attached" to) a resource instance. During a period when it is not associated with any resource instance, the interface record may exist in an inactive or quiescent mode within the NIVC's repository of interface records, retaining its properties.

In response to a request to "detach" an interface record from a resource instance to which it currently is attached, the NIVC may ensure that traffic directed to the IP address or addresses of the interface record no longer reaches the resource instance in some embodiments. The customer may also request that the NIVC now attach the interface record to a different resource instance (such as a different virtualized compute server) than the instance to which it was previously attached. This new attachment operation may then result in IP traffic targeted at the IP address(es) included within the interface record reaching the newly attached resource instance, using whichever set of physical NICs is appropriate, thus allowing the customer to easily transfer network configuration settings and associated security settings across resource instances without dealing with physical NICs directly. Various other operations such as modifications of IP addresses associated with a given interface record, modifications of security settings, billing-related operations and the like may be supported by the virtual network interface coordinator in various embodiments.

Example System Environment

FIG. 1 illustrates an example system environment, according to at least some embodiments. The system 100 may include a plurality of resource instances 120, e.g., instances 120A, 120B, 120C and 120D of a provider network, set up to provide various types of services to clients 148, such as cloud computing services or cloud storage services. Clients 148 may in turn implement a variety of services on instances 120, such as web sites with associated back-end databases, and expose them to their own customers. A resource instance 120 may for example implement a virtualized service, such as a virtual computing system or a virtual storage system, that is resident on one or more physical platforms such as service platforms 150A, 150B, and 150C of FIG. 1. A service platform 150 for a resource instance 120 that provides a virtual computing system may, for example, include a hardware server with one or more CPUs (as well as associated memory, storage and networking hardware) and the software (such as a hypervisor and/or elements of an operating system) that implements the virtualization of the computing system. Similarly, a service platform 150 that provides a virtual storage system may for example comprise portions or all of one or more hardware storage devices (such as disk arrays or storage appliances) and the associated processing elements and software.

In some embodiments, resource instances 120 may be transferable from one platform 150 to another—for example, a virtual computing system may initially be brought up on one physical server, and later moved to another physical server, as desired. Furthermore, multiple resource instances may be resident on one service platform 150—for example, resource instances 120B and 120C are shown resident on service platform 150B. The physical resources (e.g., CPUs and network cards) of a service platform 150B with multiple resident resource instances 120 may be distributed using a variety of schemes in different embodiments. In one embodiment some of the resources may be allocated exclusively to the resource instances—e.g., if the service platform 150B has four CPUs, two CPUs may be allocated to resource instance 120B, while the other two may be allocated to resource instance 120C. In another embodiment, the physical resources may be shared using time slices—for example, all four CPUs may be usable by either resource instance, with a scheduling mechanism set up to decide how CPU cycles within a given time slice are to be distributed among the instances, depending on their computing demands. In the embodiment illustrated in FIG. 1, each service platform 150 has one or more physical network interface cards (NICs)—service platform 150A has NIC 110A, service platform 150B has NIC 110B, and service platform 150C has NICs 110C and 110D. The network traffic flowing to and from a resource instance 120 that happens to be resident on a given service platform 150 flows through one or more of the NICs 110 of the service platform. In some implementations a single resource instance 120 may span multiple hardware service platforms 150, in which case any of the NICs 110 available on any of the multiple service platforms 150 may be used. In one embodiment, a resource instance 120 may comprise a non-virtualized server, i.e., a resource instance may be implemented using a conventional operating system running on a bare hardware service platform 150 instead of using hypervisor software.

System 100 may include a network interface virtualization coordinator (NIVC) 180 operable to provide a set of virtualization services for network interfaces in the illustrated embodiment. Clients 148 may submit various types of requests 153, including requests to create interface records 170, to attach them to resource instances 120, detach them, modify them, query them, and so on; each of these types of operations is described in further detail below. In response to a given request 153, the NIVC 180 may perform various operations that may affect interface records 170 and resource instances 120 on service platforms 150, as indicated by the arrows labeled 157A, 157B, 157C and 157D. For example, the NIVC 180 may, in response to create requests from clients 148, generate interface records such as 170A and 170B that may each contain a set of networking-related properties that can be associated and disassociated on demand with various resource instances 120. The interface records 170 may be generated in a set of in-memory data structures, and may be stored in a repository 185 in some implementations, such as a database on persistent storage. An interface record for a network that used the TCP/IP protocols may include, for example, one or more IP addresses, one or more subnet identifiers of the subnets that contain the IP address or addresses, and a set of security properties described in further detail below. In some implementations the interface record 170 may also include one or more other fields such as various status fields, source and destination address check settings, billing-related information, an identification of a currently associated resource instance 120, the Media Access Control (MAC) address of a physical network interface card 110 currently associated with the interface record, and the like. Interface records for networks employing network protocols other than TCP/IP may include network address-related information appropriate for the protocol used.

In some embodiments the NIVC 180 may be configured to perform "attach" operations to dynamically associate interface records 170 with resource instances 120, and to thereby enable traffic to flow to and from the resource instances 120 in accordance with the networking and security properties specified in the interface records 170. In response to an attachment request 153 received from a client 148, for example, in one implementation the NIVC 180 may perform some or all of the following operations: (a) validate, based on the security information stored in the specified interface record 170 and/or elsewhere, that the client is authorized to request the attachment of the interface record with the specified resource instance 120; (b) verify that the networking information (IP address or addresses, subnet identifier, etc.) of the interface record is appropriate for activation of network traffic to and from the specified resource instance 120 (e.g., the NIVC 180 may check whether an IP address is already in use for another instance and therefore is unavailable); (c) ensure that a physical NIC 110 is operational and available for use by the resource instance 120 at the service platform 150 where the resource instance 120 is currently resident; (d) initiate or make the necessary configuration changes, e.g., in hypervisor or operating system software running at the service platform 150 and at the appropriate routers, gateways and other network devices of the provider network, to allow the specific resource instance 120 to begin to send traffic from, and receive traffic at, the IP address or addresses specified in the interface record; and (e) make changes to the interface record 170 and/or repository 185 to reflect the attach operation performed. As part of the configuration changes, new or modified routing information such as routing table entries may be propagated to a set of routers, gateways, and the like in some implementations. In one embodiment the NIVC 180 may ensure that each resource instance 120 has at least one interface record 170 attached to it whenever the resource instance is activated or brought up.

The NIVC 180 may also be operable to "detach" or disassociate an interface record 170 from a resource instance 120 to which it is currently attached in some embodiments. In response to a detachment request 153 from a client 148, the NIVC 180 in such embodiments may prohibit further traffic directed to or from the IP address or addresses specified in the interface record 170 from flowing to or from the resource instance. In order to do so, the NIVC 180 may perform some or all of the following operations: (a) validate, based on the security information stored in the specified interface record 170 and/or elsewhere, that the client is authorized to request the detachment of the interface record from the specified resource instance 120; (b) initiate or make the necessary configuration changes, e.g., within hypervisor or operating system software running at the service platform 150 and at the appropriate routers, gateways and other network devices, to prevent network traffic associated with the IP address(es) of the interface record 170 from flowing to or from the specified resource instance 120 and (c) make changes to the interface record 170 and/or repository 185 to reflect the detach operation performed.

An interface record 170 that was previously attached to a particular resource instance 120, and then detached from that resource instance 120, may later be attached to any desired resource instance (either a different resource instance, or the same resource instance to which it was previously attached) by the NIVC 180 at the request of a client in some embodiments. In such embodiments the same IP address may be used first, during one "attachment period", to send and receive traffic at one resource instance 120A through a particular NIC 110A, and then during a subsequent "attachment period", to send and receive traffic at a different resource instance 120B, potentially through a different NIC 110B and/or at a different service platform 150. In addition to allowing clients to map a given IP address to different resource instances 120 at different times, the NIVC 180 may also allow the client to re-use some or all of the security settings associated with an interface record 170, thus substantially reducing the effort and complexity required for making networking configuration changes. In many embodiments multiple interface records 170 may be attached to a single resource instance 120, thus allowing multiple IP addresses to be used for the same resource instance. In some implementations a single interface record 170 may be attached to multiple resource instances 120 at the same time: for example, NIVC 180 may be capable of distributing or load-balancing traffic directed at a single IP address specified in an interface record 170 across two or more resource instances 120. Using these capabilities of NIVCs 180, a highly flexible mapping of IP addresses, subnets, and network security settings to resource instances 120 may be implemented in various embodiments.

Example Constituent Elements of Interface Records

Figure 2:
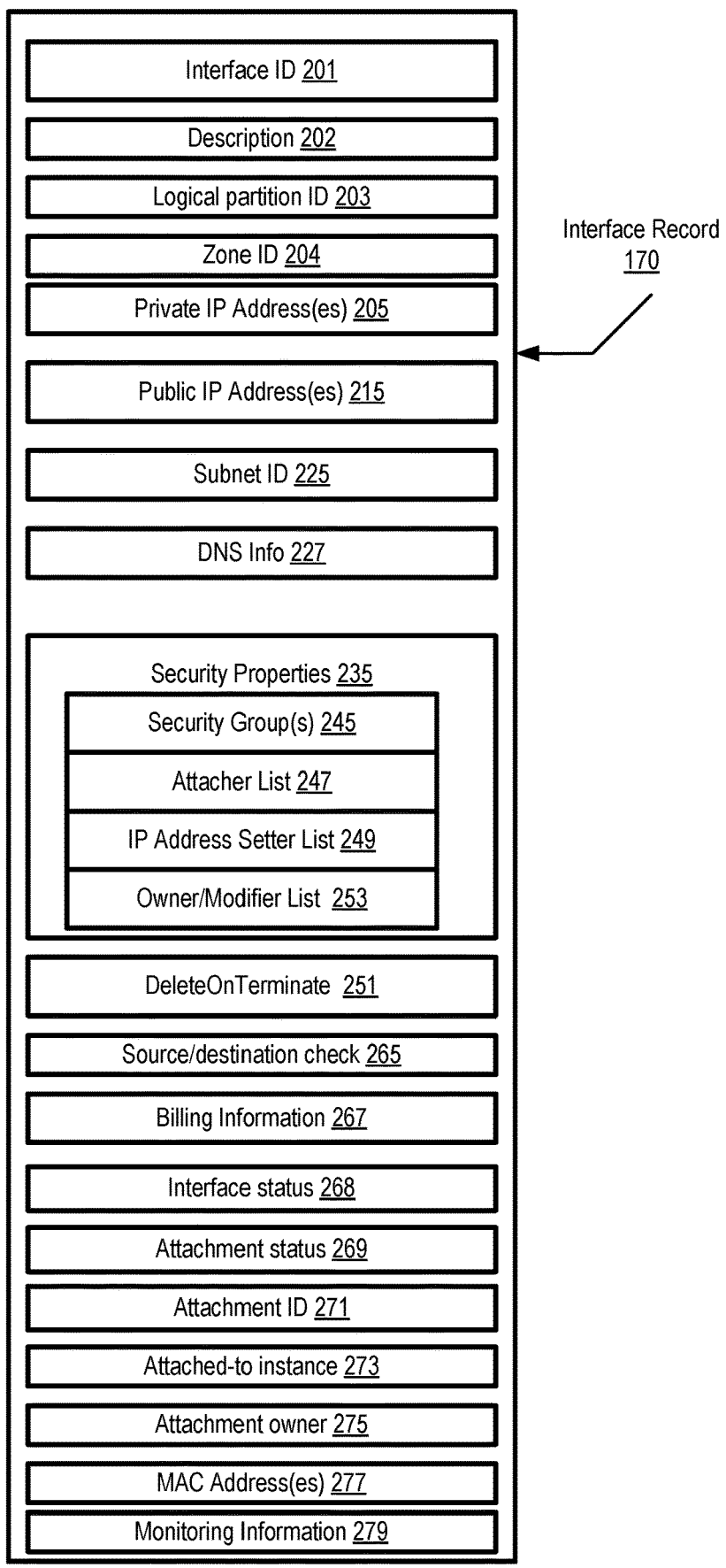
FIG. 2 illustrates examples of constituent elements of an interface record, according to at least some embodiments.

FIG. 2 illustrates examples of the constituent elements of an interface record 170, according to at least some embodiments. Only a subset of the elements or fields shown in FIG. 2 may be implemented in some implementations, and not all the implemented fields may have to be populated (i.e., some of the fields may be left blank or null). When an interface record 170 is created, a new interface identifier 201 may be created for it. In some implementations, a description field 202 may be filled in by the client 148 that requested the interface record creation, e.g., "Interface 1 for news web site". A provider network in which the interface record is to be used may comprise a plurality of logical partitions in some embodiments, and the interface record 170 may contain logical partition identifier 203 in such cases. For example, the operator of the provider network may establish a logical partition for a particular customer by setting aside a set of service platforms 150, a set of network address ranges, other equipment or resources, and network administration capabilities for exclusive use by that customer, effectively providing the customer with its own isolated and private data center or centers even though the equipment being used by the customer may actually be resident at facilities shared by other customers. A logical partition may include resources that are geographically distributed in some embodiments, thereby granting the customer the benefits of access to a virtual private "cloud" of resources. In some cases the interface record 170 may include a zone identifier 204, which may for example indicate a geographical region or set of data centers whose service platforms 150 may be available for attachment to the interface record 170.

Any of several types of network addressing-related fields may be included within an interface record 170 in different embodiments. One or more private IP addresses 205 may be specified for the interface record in some embodiments; these IP addresses may be used internally for routing within the provider network, and may not be directly accessible from outside the provider network. One or more public IP addresses 215 may also be included in some embodiments; these IP addresses may be visible outside the provider network, e.g., to various routers of the public Internet or peer networks of the provider network. Various devices or components, including for example components of NIVC 180, may implement any desired network address translation technique or techniques to translate between public IP addresses 215 and private IP addresses 205 in various embodiments as needed. One or more subnet identifiers 225 may be included within an interface record.

The term subnet, as broadly used herein, is a logically visible subdivision of a network. In the case of IP networks, the set of logical or physical devices that belong to a subnet may be addressed with a common, identical, most-significant bit-group in their IP address. This results in the logical division of an IP address into two fields, a network or routing prefix and the "rest" field. The rest field may serve as a specific identifier for the logical or physical device. The routing prefix may be expressed in Classless Inter-Domain Routing (CIDR) notation, which may be written as the first address of a network followed by the bit-length of the prefix, separated by a slash (/) character. For example, 10.1.1.0/24 is the prefix of an Internet Protocol Version 4 network starting at the address 10.1.1.0, having 24 bits allocated for the network prefix, and the remaining 8 bits reserved for device identification. In IPv4 the routing prefix may also specified in the form of the subnet mask, which is expressed in quad-dotted decimal representation like an address. For example, 255.255.255.0 is the network mask for the 10.1.1.0/24 prefix. Slightly different notation may be used for IP Version 6 networks and for networks that use protocols other than the TCP/IP suite. Subnets may be used in general for a variety of reasons—for example to provide logical isolation between different sets of network-addressable devices, to arrange the resources of a logical partition (such as a virtual private cloud) into hierarchies for easier administration, and so on. A subnet identifier 225 included within an interface record 170 may comprise, in some implementations, a string that may in turn include or encode the CIDR representation for the subnet—e.g., "subnet-df543fda-10.1.1.0/24". In one embodiment an identification of a Domain Name Server (DNS) may be included in the interface record 170 as well.

In some embodiments the interface record 170 may include security-related properties 235. Some provider networks may allow users to specify rules, including for example firewall-related rules, for the types of incoming and/or outgoing traffic allowed at resource instances 120 to which an interface record 170 may be attached; such rules may be termed "security groups" and identified via security group(s) fields 245. Various port and protocol restrictions may be enforced using such rules, and multiple rules may be associated with each interface record. For example, a user may use security groups to ensure that only HTTP and HTTPs outgoing or incoming traffic is allowed, to limit the set of TCP or UDP (User Datagram Protocol) ports to which traffic is permitted, to filter incoming and outgoing traffic according to various policies, and so on. In some implementations an attacher list 247 may be specified, indicating which users or entities are allowed to request attachments of the interface record 170 to resource instances 120. In some cases a separate detacher list may be used to specify which entities can detach the interface record 170, while in other cases a single list such as attacher list 247 may be used to identify authorized attachers and detachers. The set of users or entities that are allowed to set or modify IP addresses (e.g., public IP addresses 215 and/or private IP addresses 205) of the interface record 170 may be provided in IP address setter list 249, and the set of users or entities that own (or can modify various other fields of) the interface record 170 may be specified in owner/modifier field 253 in some embodiments. For example, an owner/modifier identified in field 253 may be permitted to change the attacher list 247 or the IP address setter list in some implementations, thus changing the set of entities permitted to attach or detach the interface record or modify its IP address(es). While the term "list" has been used for fields 247, 249, and 253, logical data structures other than lists (such as arrays, hash tables, sets and the like) may be used to represent the groups of entities given various security privileges, roles and/or capabilities in various embodiments.

In some embodiments, users may be allowed to "terminate" resource instances 120. For example, a client 148 may set up virtual compute server resource instances 120, attach interface records 170 to the instances, run a desired set of computations on the instances, and then issue a request to terminate the instances when the desired computations are complete (thus indicating that the resource instances 120 are no longer required). In such embodiments, a "DeleteOnTerminate" setting 251 may be used to specify what happens to attached interface records 170 when a resource instance 120 is terminated. If DeleteOnTerminate is set to "true" for an interface record 170 attached to the resource instance 120 being terminated, the NIVC 180 may delete the interface record 170 (e.g., the record may be removed from repository 185). If DeleteOnTerminate is set to "false", the NIVC 180 may retain the interface record 170, so that for example it may be attached again to some other resource instance. In one embodiment, when an interface record 170 is attached to a resource instance 120, an attachment record separate from the interface record may be created to represent that relationship, and the DeleteOnTerminate property may be associated with the attachment record instead of or in addition to being associated with the interface record. In such an embodiment, the interface record 170 may include a reference or pointer to the attachment record or records for each of the attachments in which the interface record is currently involved, and different values of "DeleteOnTerminate" may be set for each attachment record. In such an environment, an instance record 170 that happens to be unattached to any resource instances 120 may not have a "DeleteOnTerminate" property associated with it as long as it remains unattached. By persisting interface records independently of resource instances in this way, the overhead of setting up various security-related and other properties each time a new instance is activated may be reduced for clients 248.

In one embodiment, the interface record 170 may contain routing-related information such as an indication 265 of whether a source and/or destination check is to be performed for network packets transmitted to a resource instance 120 to which the interface record 170 is attached. If the source/destination check setting is set to "false" or "off", routing decisions may be made based on a packet's source and destination IP addresses, e.g., the packet may be forwarded from one subnet to another; and if the setting is "true" or "on", the resource instance may not perform routing in some embodiments. Thus the source/destination field 265 may be used in some embodiments to control whether a resource instance to which the interface record is attached performs routing or gateway functions on packets for which it is not the final destination, or whether it ignores such packets. Other types of routing-related information, such as routing table entries, may also or instead be included in interface records 170 in other embodiments. Billing-related information 267 may be included in some implementations, identifying for example the entity or user to be billed for network traffic associated with the interface record 170. In some implementations customers may be billed at least partially based on the number of instance records 170 they create, independently of how many of the instance records are attached to resource instances; in other implementations billing may include both recurring charges (e.g., based on the number of instance records and/or the number of instance records attached) and non-recurring charges (e.g., based on traffic flow measurements).

The interface status field 268 may be used to indicate a current state of the interface record 170—e.g., whether the interface record is "available", "disabled", or "in-repair". Similarly, the attachment status field 269 may be used to indicate whether the interface record 170 is currently attached, detached or in the process of being attached or detached in some embodiments. In one implementation, as described above, a record of an attachment (separate from interface record 170) may be created at the time the corresponding attachment operation is performed, and an identifier or identifiers of the current attachments of the interface record 170 may be stored in attachment id field 271. Identifiers of the resource instance or instances 120 to which the interface record 170 is currently attached may be stored in attached-to instance field 273, and the user or entity that requested the attachment may be identified via attachment owner field 275 in some embodiments. In one embodiment, a list of identifiers of the NIC or NICs 110 currently usable for traffic directed to/from the IP addresses of interface record 170 may be maintained, e.g., in the form of a MAC address(es) field 277. In some implementations, monitoring information 279, such as statistics about the amount of traffic flowing to or from the IP addresses of the interface record, may also be retained with the interface record. Other fields not shown in FIG. 2 may be included in interface records 170 in various embodiments. In some embodiments, clients may associate tags, such as a virtual local area network (VLAN) tag formatted in accordance with a VLAN standard (such as the 802.1Q standard) with interface records 170 to implement network isolation. In such embodiments such a tag may also be stored in, or referenced from, the interface record 170.

In one embodiment, some of the fields shown in FIG. 2 may be replaced by references or pointers to other objects. For example, security information for an interface record 170 may be stored in a separate security object, and the interface record 170 may store a reference to the security object. Similarly, each attachment of a resource instance 120 to an interface record 170 may be represented by an attachment object, and the interface record may point or refer to the appropriate attachment object in some implementations.

Attachment, Detachment, and Instance Move Operations

Figure 3:
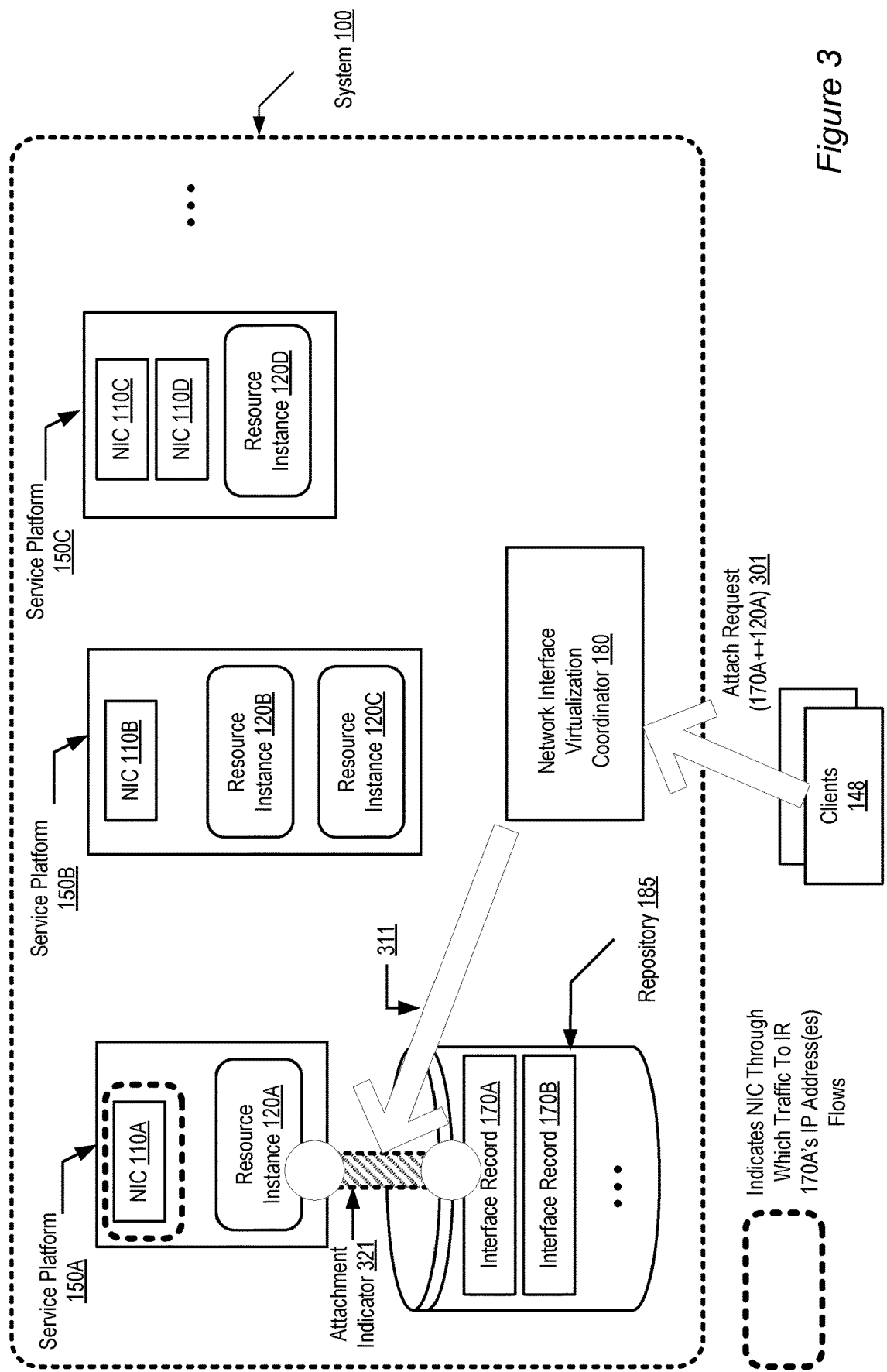
FIG. 3 illustrates an operation in which an interface record is attached to a resource instance, according to some embodiments.

FIGS. 3-7 illustrate examples of several types of operations supported by NIVC 180 in various embodiments. FIG. 3 illustrates an operation in which an interface record 170 is attached to a resource instance 120, according to some embodiments. An attachment request 301 may be sent by a client 148 to NIVC 180, identifying the interface record 170A and the resource instance 120A to which the interface record is to be attached. In FIG. 3, the notation "++" (as in "170A++120A") for request 301 indicates that the request is an attachment request. On receiving the request, NIVC 180 may verify that the requesting client is authorized to request the attachment and that the addressing and other information in the interface record is valid, and then initiate the necessary configuration changes to enable traffic to flow to and from the resource instance 120A in accordance with the details specified in the interface record 170A. The operations performed by NIVC 180 in response to the attachment request 301 are indicated in FIG. 3 by the arrow labeled 311 and the attachment indicator 321. As noted earlier, a number of configuration changes may have to be made and/or propagated, e.g., at the hypervisor or operating system of the platform 150A where the resource instance 120A is resident, and at various networking devices such as routers and gateways of a provider network being used. The interface record 170A itself may be modified in some embodiments, e.g., by changing the values of various constituent elements such as the interface status 268, attachment status 269, attachment ID 271, attached-to instance 273, attachment owner 275, and/or MAC address field 277. In the illustrated example, the MAC address field 277 of interface record may be set to the MAC address of NIC 110, the NIC usable by resource instance 120A as shown by the dashed lines surrounding the NIC.

Interface records 170 may be attached to resource instances 120 at many different stages of a resource instance's lifecycle in one embodiment. For example, a resource instance 120 may be in a running state subsequent to booting (and may already be servicing requests received at an IP address of another interface record to which it is already attached) when a particular interface record is attached to it. In some embodiments NIVC 180 may permit interface records 170 to be attached to a resource instance 120 even if the resource instance 120 is not currently up or running—for example, when the resource instance is stopped or suspended, or is in the process of being activated. In such a case, for example, a network interface record may be attached to the resource instance before the resource instance is activated or booted, and even before the service platform 150 on which it is to be brought up is selected. If insufficient information is available at the time the attachment operation is requested—for example if the MAC address of the NIC or NICs to be used are not yet known— NIVC 180 may leave some of the fields of the interface record 170A blank or null until the values do become available. In some embodiments, NIVC 180 may generate and/or store records or data structures for each attachment— e.g., an object with an associated attachment identifier may be stored in repository 185 or some other database, identifying the resource instance 120A, the interface record 170A, and other information pertaining to the attachment, such as the time at which the attachment operation was initiated or completed. In some embodiments a given client 148 may have a set or pool of interface records 170 available for use for the client's resource instances 120, and the client may simply request that NIVC 180 choose an available interface record 170 from the pool of interface records to attach to a specified resource instance 120.

The IP addresses used for the resource instance 120 attached to the interface record 170 may be modifiable in some embodiments after the attachment operation is completed. For example, if a user or entity identified as being authorized to change an IP address such as a public IP address 215 or a private IP address 205 sends an IP address modification request to NIVC 180, the NIVC may make the necessary configuration changes needed to make the requested change effective. For example, on receiving the IP address modification request for an interface record 170, the NIVC may first determine which resource instances 120 (if any) are currently attached to the interface record 170, and then enable traffic directed at the changed IP address to reach those resource instance(s), and make the needed changes in the interface record 170 itself. In one embodiment, one or more of the IP addresses associated with the interface record 170, such as either a public IP address 215 or a private IP address 205, may be selected by NIVC 180 on behalf of the client from a set of IP addresses allocated for the client.

Figure 4:
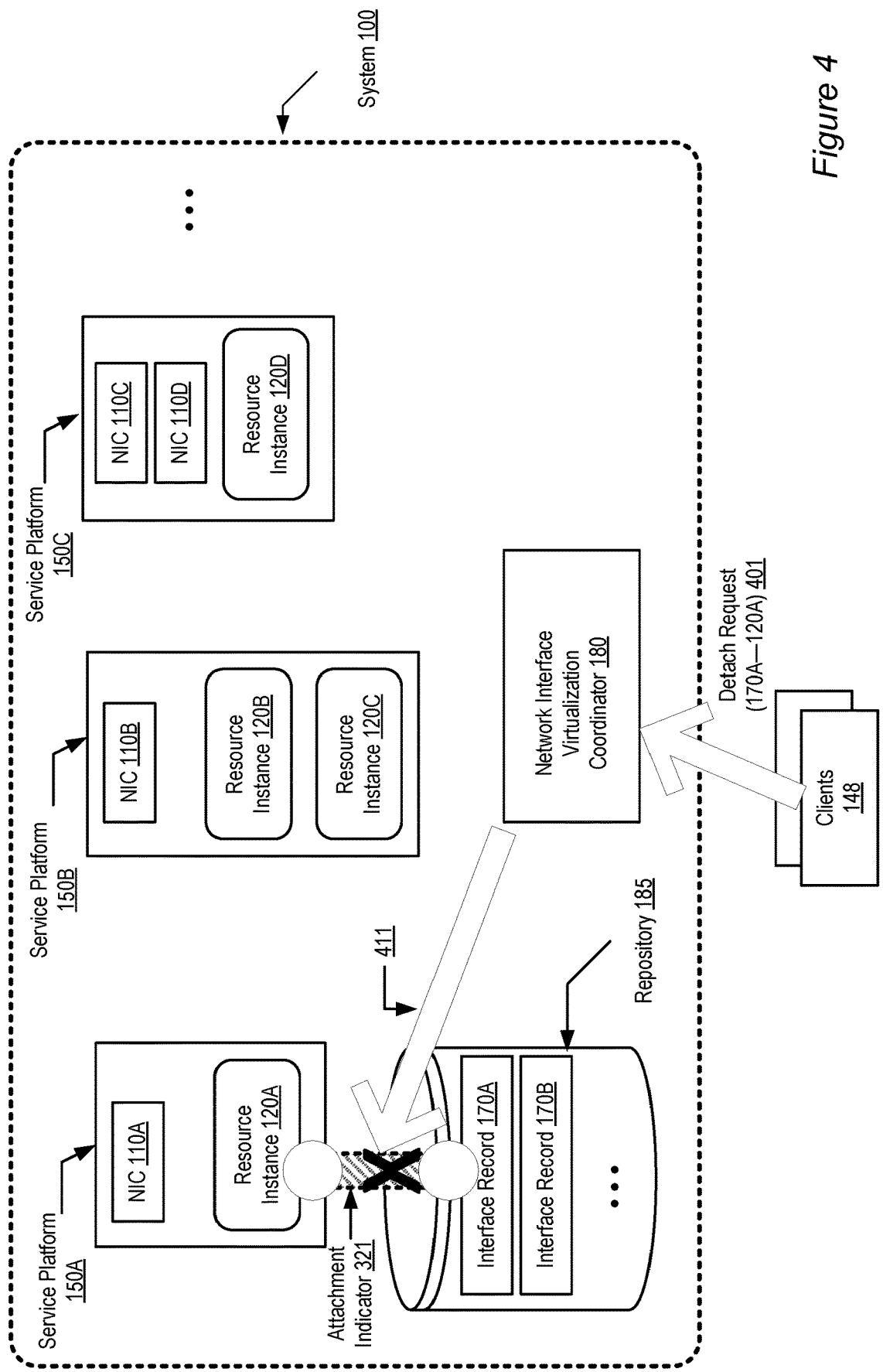
FIG. 4 illustrates an operation in which an interface record is detached from a resource instance, according to some embodiments.

FIG. 4 illustrates an operation in which an interface record 170 is detached from a resource instance 120, according to some embodiments. A detachment request 401 may be sent by a client 148 to NIVC 180, identifying the interface record 170A and the resource instance 120A from which the interface record is to be detached. In FIG. 3, the notation "--" (as in "170A--120A") for request 401 indicates that the request is a detachment request. On receiving the request, NIVC 180 may in some implementations first verify that the specified interface record 170A is in fact currently attached to the resource instance 120A. If the interface record 170A is not attached to the resource instance 120A, the NIVC 180 may either send an error message back to the requesting client 148, or in some implementations simply log and/or ignore the request. If the interface record 170A is attached to the resource instance 120A, the NIVC 180 may check that the requesting client is authorized to request the detachment, and then initiate the necessary configuration changes to disable traffic to flow to and from the resource instance 120A in accordance with the details specified in the interface record 170A. The operations performed by NIVC 180 in response to the detachment request 301 are indicated in FIG. 4 by the arrow labeled 411 and the "X" across the attachment indicator 321. The detachment configuration changes may in effect simply undo the attachment configuration changes described earlier. The interface record 170A itself may be modified in some embodiments, e.g., by changing the values of various constituent elements such as the interface status 268, attachment status 269, attachment ID 271, attached-to instance 273, attachment owner 275, and/or MAC address field 277. In the illustrated example, the MAC address field 277 of interface record may be set to null upon detachment.

In some embodiments, a detachment request 401 may not explicitly identify the interface record 170A that is to be detached—instead, the requesting client may simply indicate that any attached interface records 170A should be detached from the specified resource instance 120. In such a case, NIVC 180 may be operable to first discover, e.g., by looking up the information in repository 185, which interface records 170 should be detached from the resource instance 120 specified, and then initiate the detachment operations. Such a request (to detach all attached interface records 170) may, for example, be generated when a resource instance is being shut down, disabled, terminated or discarded. In some implementations, if the "DeleteOnTerminate" field is set to true for an interface record 170 and an attached resource instance 120 is being terminated, the interface record itself may be deleted from repository 185; otherwise, if "DeleteOnTerminate" is set to false, the interface record may be retained in the repository together with its properties, for possible reuse later. As noted above, in some embodiments the "DeleteOnTerminate" property may be associated with attachment records to which the interface record may refer, instead of being associated with the interface records themselves. In some implementations a detachment request 401 may not necessarily indicate a resource instance 120A, and may only indicate that the specified interface record 170A should be detached from whichever resource instance 120 (if any) to which it happens to be attached.

Figure 5:
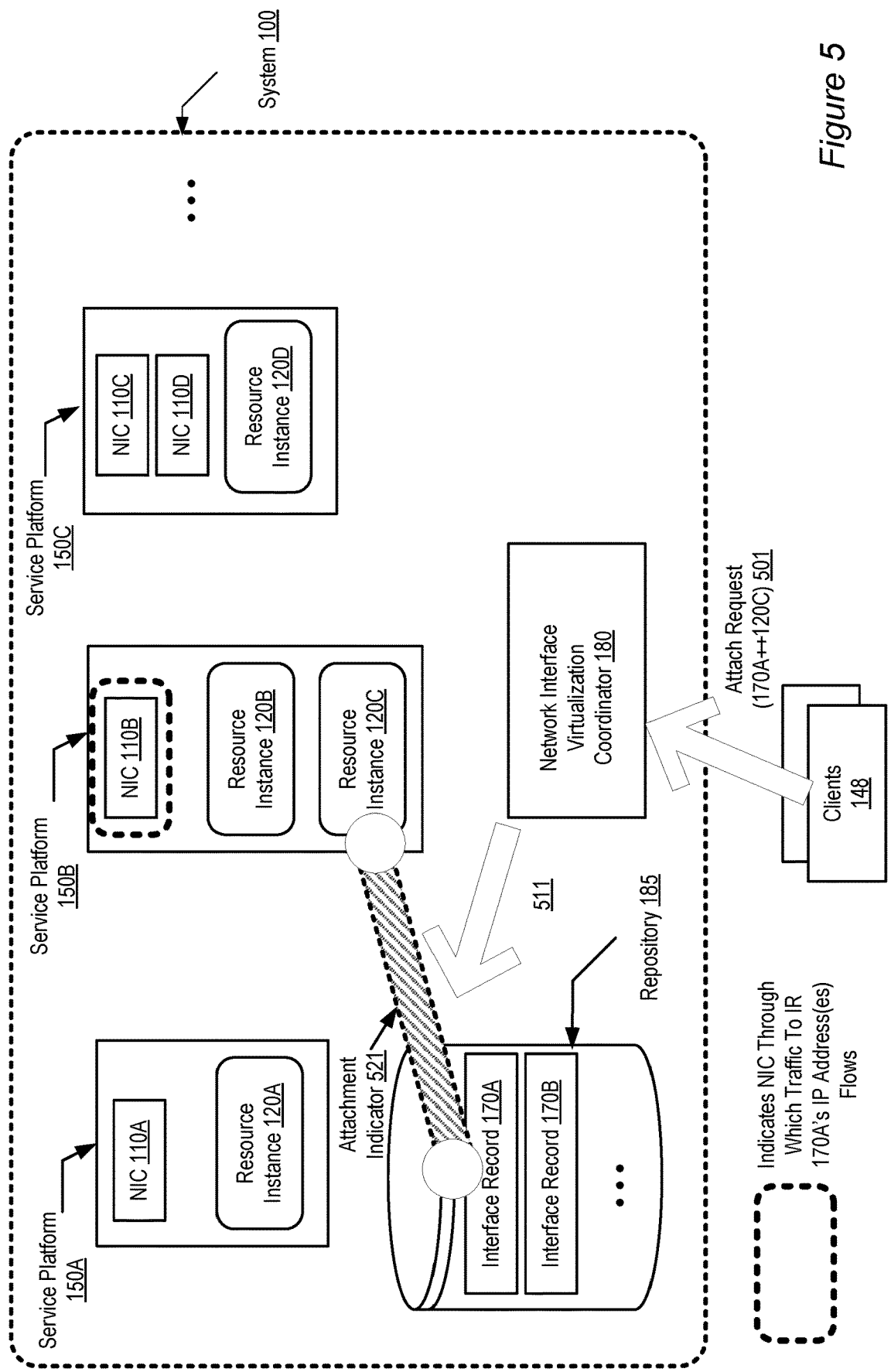
FIG. 5 illustrates an operation in which an interface record is attached to a different resource instance than the instance to which the record was previously attached, according to some embodiments.

FIG. 5 illustrates an operation in which an interface record 170A that was previously attached to one resource instance 120A, and then detached, is attached to a different resource instance 120C, according to some embodiments. An attachment request 501 may be sent by a client 148 to NIVC 180, identifying the interface record 170A and the resource instance 120C to which the interface record is to be attached. In FIG. 5, as in FIG. 3, the notation "++" (as in "170A++ 120C") indicates that the request is an attachment request. On receiving the request, NIVC 180 may perform functions analogous to those described earlier in conjunction with the description of FIG. 3, this time attaching the interface record 170C to resource instance 120C, resident on a different service platform (150B) than the previously-attached instance 120A, and using a different NIC (NIC 110B, as indicated by the dashed lines in FIG. 5). The operations performed by NIVC 180 in response to the attachment request 501 are indicated in FIG. 5 by the arrow labeled 511 and the attachment indicator 521. The use of interface records 170 that can be dynamically attached to different resource instances 120 (and can dynamically change the NICs 110 used) allows NIVC 180 to provide clients 148 with significant flexibility in the network architectures used for their applications, and with opportunities to collaborate across business boundaries, as will be described below in the section on use cases. For example, in one environment resource instances 120 may have been set up to handle web service requests of a particular application from customers. In such an environment, simply by detaching interface record 170A from one resource instance 120A as shown in FIG. 4, and then attaching the interface record with a different resource instance 120C, while keeping the IP address(es) of the interface record 170A unchanged, a workload of incoming web service requests that were previously being handled at resource instance 120A can now be handled at resource instance 120C. This may allow clients 148 to provide enhanced availability, e.g., if resource instance 120A experiences an outage or failure, or an easy-to-use mechanism for deploying an enhanced version of the web service application, e.g., if resource instance 120C has the enhanced version.

Figure 6:
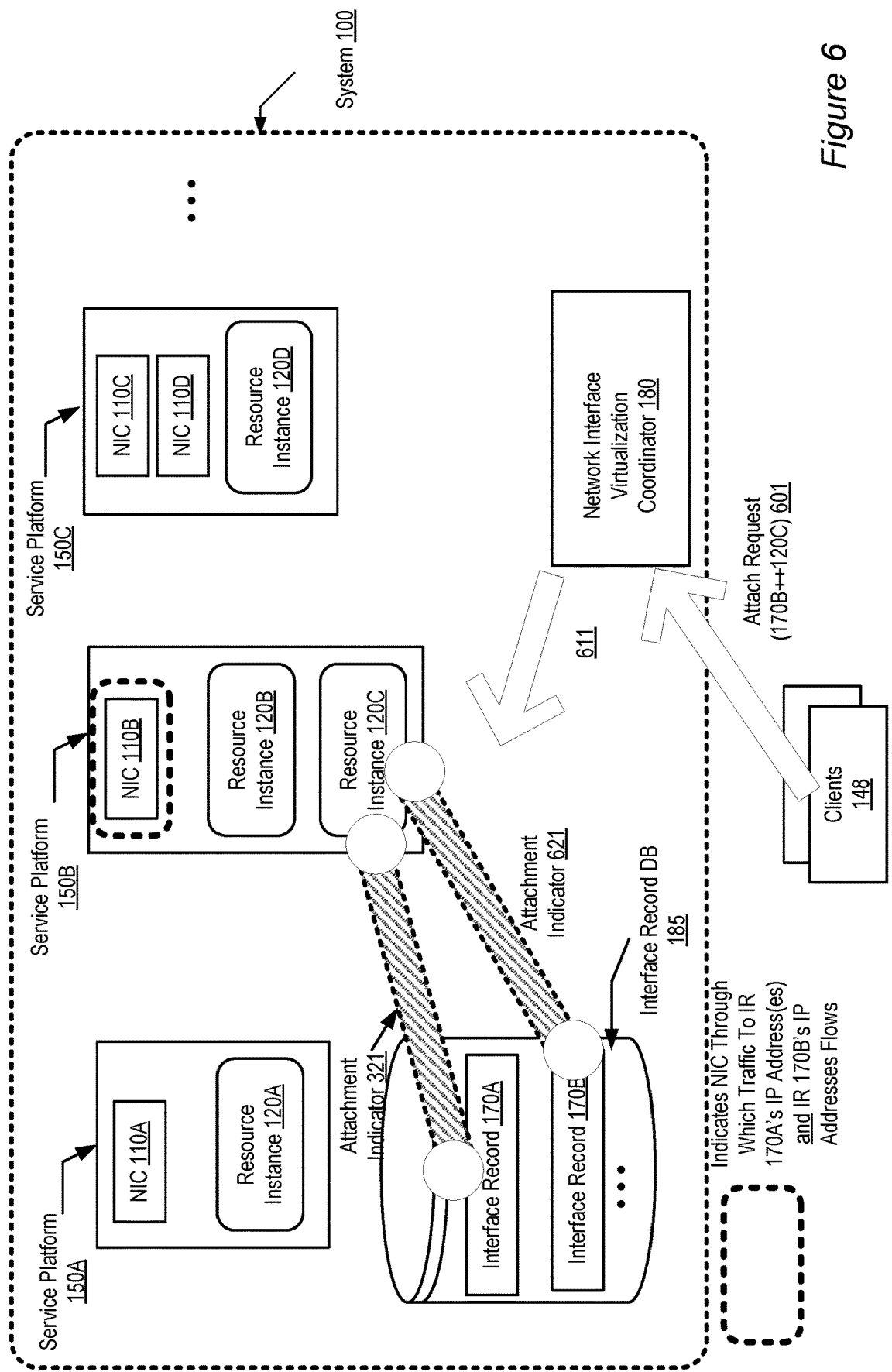
FIG. 6 illustrates an operation in which a second interface record is attached to a resource instance, according to some embodiments.

In some embodiments NIVC 180 may allow multiple interface records 170 to be attached to the same resource instance 120. FIG. 6 is an illustration of one such embodiment, where a second interface record 170B is attached to a resource instance 120C that already has an interface record 170A attached to it. In response to attachment request 601, NIVC 180 may perform operations analogous to those described for the attachment request 301 of FIG. 3, such that network traffic to and from resource instance 120C eventually flows in accordance with the properties of both interface records 170A and 170B. The operations performed by NIVC 180 in response to the attachment request 601 are indicated in FIG. 6 by the arrow labeled 611 and the additional attachment indicator 621. In the example illustrated in FIG. 6, a single NIC 110B is used to handle the traffic for both attached interface records 170A and 170B. In some embodiments, the mapping between interface records 170 and physical NICs 110 may be flexible: that is, traffic flowing through a given NIC 110 may correspond to any number of interface records 170, and traffic for a given interface record 170 may flow through multiple physical NICs 110.

Figure 7:
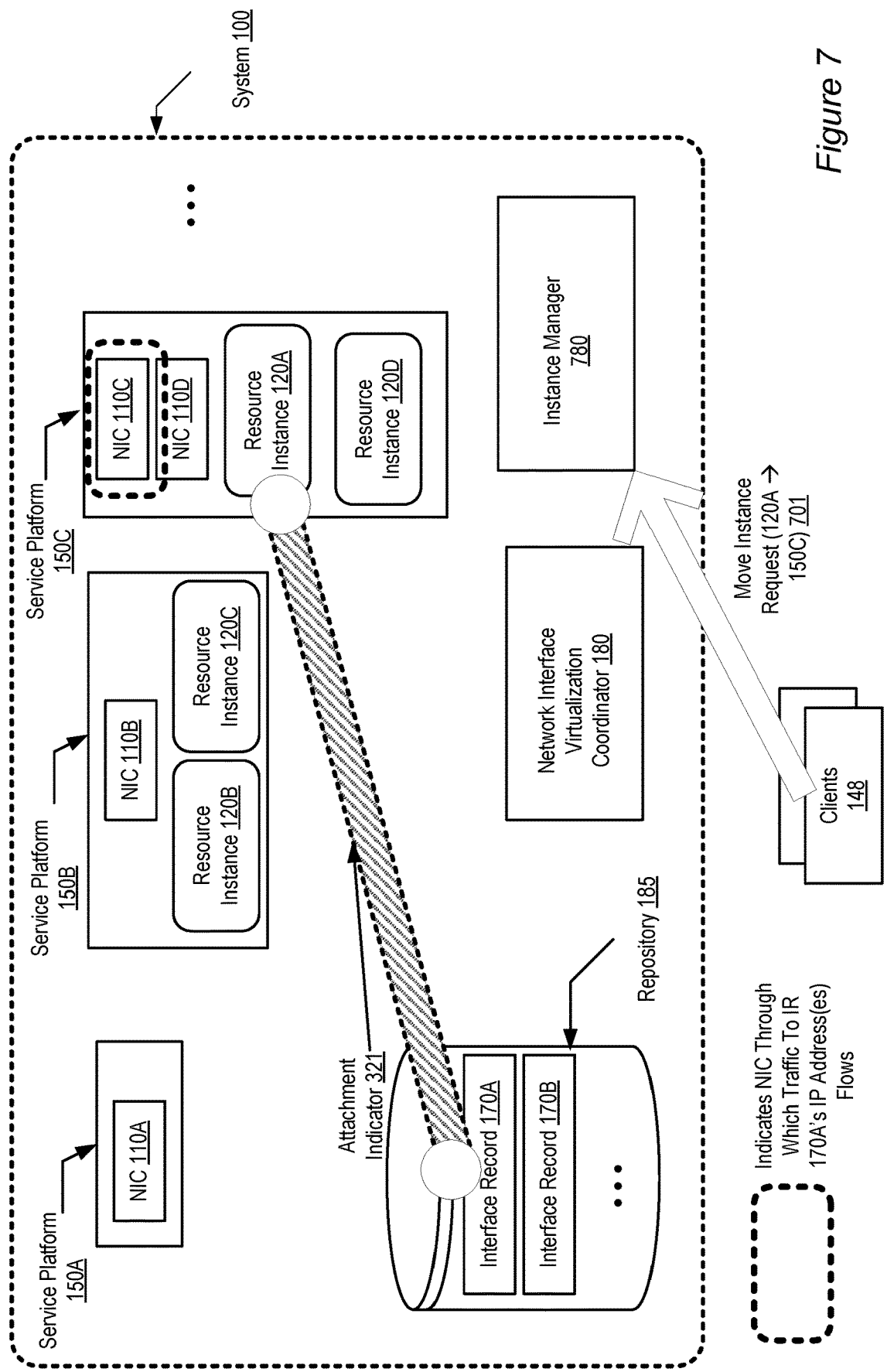
FIG. 7 illustrates an operation in which a resource instance with an attached interface record is moved from one service platform to another, according to some embodiments.

In some implementations resource instances 120 may be transferable across service platforms 150 while retaining their attached interface records 170 and at least some of the corresponding networking-related properties. FIG. 7 illustrates an operation in which a resource instance 120A with an attached interface record 170A (as shown previously in FIG. 3) is moved from one service platform 150A to resource instance 150C, according to at least some embodiments. In FIG. 7, a client 148 sends a "move instance" request 701 to an instance manager 780 of system 100, indicating that the resource instance 120A that was so far resident on service platform 150A should now be made resident on service platform 150C. The notation "→" (as in "120A→150C") for request 701 indicates that the request is a move request. On receiving the request, instance manager 780, together with NIVC 180, may perform the tasks needed to implement the requested move. For example, the move request 701 may be validated to ensure that the requester has the right permissions, the resource instance 120A may then be suspended or brought into a state in which incoming requests are temporarily queued. The resource instance 120A may then be brought up or enabled on the service platform 150C, and configuration changes needed to make traffic directed at the IP address(es) of the attached interface 170A flow through an appropriate NIC or NICs 110 at the service platform 150C may then be initiated. In the example shown in FIG. 7, traffic to and from the resource instance 120A is routed through NIC 110C after the instance has moved (the MAC address field of the interface record 170A may be modified to reflect this in some embodiments). In this way, the networking properties of a resource instance (i.e., the networking properties of its attached interface records) may be made substantially independent of the actual networking hardware used. Although a separate instance manager 780 is shown in FIG. 8, the functions of moving resource instances may be managed together with the interface virtualization functions in some embodiments, i.e., the same software and/or hardware entities may support resource instance administration operations and interface record management operations as well.

Example Use Cases

The ability to dynamically attach and detach one or more interface records 170 with specified IP addresses and subnets to resource instances 120, enabled by the functionality described above, allows customers to easily set up several different useful types of network configurations. FIGS. 8*a*-8*d* provide illustrations of a number of such example network configurations achievable, according to some embodiments.

The networking configurations illustrated in FIGS. 8*a*-8*d* show three different organizational or hierarchical levels for a provider network that may contain resource instances 120: the logical partition level, the subnet level, and the interface record level. The operator of such a provider network may allow a given customer (such as a business or organization that wishes to utilize virtual computing and/or virtual storage services supported by the provider network) to set up one or more logical partitions dedicated for use by that customer. A logical partition may, for example, comprise a relatively large set of service platforms 150 and a relatively large number of IP addresses that may be usable for various resource instances 120 that may be brought up on those service platforms as needed by the customer, and the customer may be provided network administration capabilities for that set of resources. In some embodiments, for example, the set of IP addresses of a logical partition may be specified in CIDR notation as a "/16" block such as "10.1.0.0/16", which indicates that up to 65,536 IP addresses may be usable for that logical partition. Logical partitions may be termed "virtual private clouds" in some embodiments. A logical partition may have one or more gateways set up for it in some implementations, such as Internet gateways or virtual private network (VPN) gateways. In addition, in some implementations a default DNS server may be set up for each logical partition, and one or more subnets and routing table entries may also be set up when the logical partition is set up. For example, in one implementation when a customer requests that a logical partition with a "/16" block be set up, the customer may be required to specify the CIDR specification for at least one "/24" subnet that is to be set up within the logical partition as well. A "/24" subnet, e.g., "10.1.1.0/24", includes 256 IP addresses. The customer on whose behalf the logical partition is set up may be allowed to perform a wide variety of network administration tasks as desired in some embodiments, such as setting up subnets of various sizes, and creating, attaching and detaching interface records 170 as needed. Different logical partitions and subnets may be set up to achieve various levels of logical isolation: for example, a customer may wish to isolate software development build-related network traffic from corporate e-mail network traffic, and may set up an appropriate hierarchy of logical partitions and subnets to do so. In one embodiment, the CIDR specifications may refer to private IP addresses for interface records 170 (stored for example in fields 205 shown in FIG. 2), while public IP addresses (stored in fields 215) may be selected in accordance with other policies. Identifiers for subnets (field 225 of FIG. 2) and logical partitions (field 203) may be stored within the interface records in some embodiments. In some embodiments some or all of the addressing information (logical partition identifier, subnet identifier, private and/or public IP addresses) of an interface record may be dynamically modifiable after the creation of the interface record 170.

Use Case Scenario 1: Multiple IP Addresses within a Single Subnet

Figure 8A:
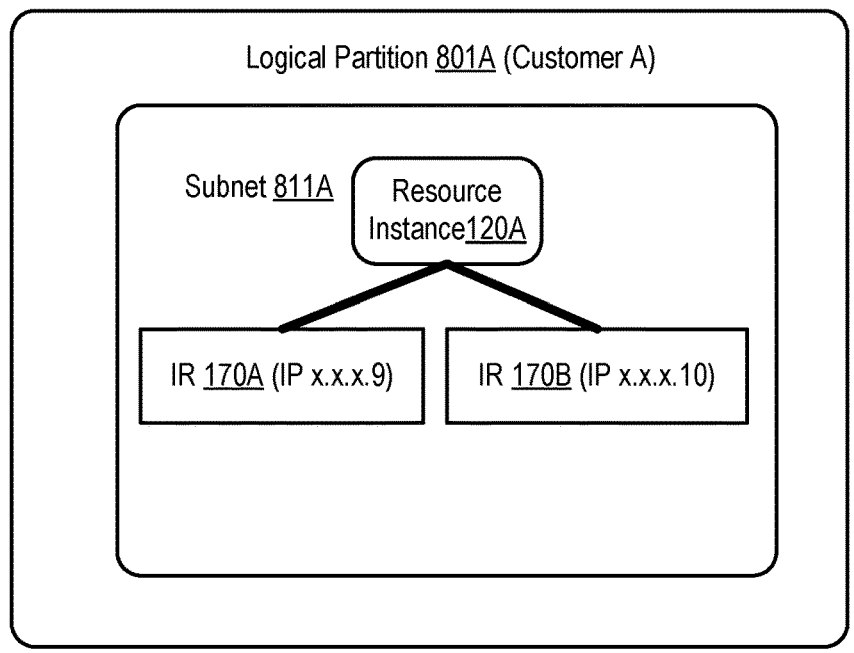

FIG. 8a illustrates a simple networking configuration in which two interface records 170A and 170B are associated with a single resource instance 120A within a subnet 811A, according to one embodiment. The interface record 170A is shown with example IP address x.x.x.9 and the interface record 170B is shown with example IP address x.x.x.10. (The notation "x.x.x" common to the two addresses means that the first three dot-separated elements of the two IPV4 addresses are identical in this case, for example the two addresses may be 11.2.3.9 and 11.2.3.10.) By attaching multiple interface records 170 as shown, as many different IP addresses as desired may be associated with the same resource instance in some embodiments. This may be useful, for example, to isolate traffic for different applications or application instances by IP address. In one environment, for example, several different web sites may be set up on a single resource instance 120, each with its own IP address. In another embodiment, a customer may have multiple web servers serving the same underlying content set up on a single resource instance 120, and may wish to associate each web server with a different IP address.

Figure 8B:
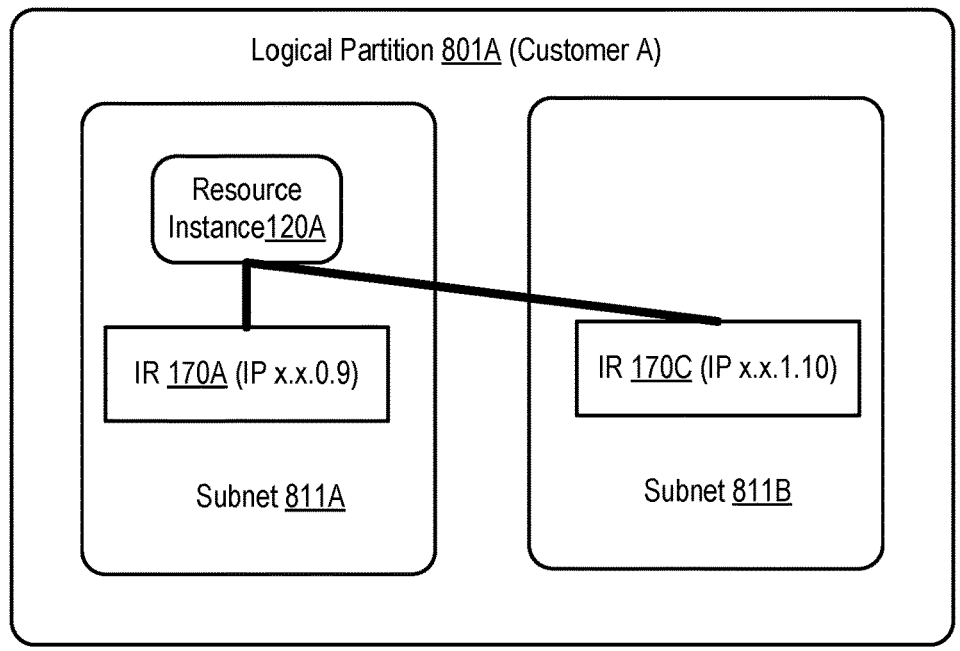

Use Case Scenario 2: Attaching to Multiple Subnets in a Single Logical Partition FIG. 8b illustrates a configuration in which two interface records 170A and 170C from different subnets are associated with a single resource instance 120A, according to one embodiment. The interface record 170A is shown with example IP address x.x.0.9 within subnet 811A and the interface record 170C is shown with IP address x.x.1.10 within a different subnet 811B. This kind of configuration may be useful, for example, in an environment where network management traffic flows through one subnet 811A while application data traffic flows through another subnet 811B, with each subnet having different security properties. In one such case, a subnet 811A for network management traffic may have stricter security rules and access controls than a subnet 811B used for application data. In another example, a resource instance 120 attached to multiple subnets 811 may also be configurable to perform various network security functions. For example, if traffic from a first subnet 811A has to be routed to a second subnet 811B through the resource instance 120, the resource instance may implement a firewall, serve as an anti-virus gateway, perform intrusion detection and/or other types of network traffic analysis, filtering, or monitoring, and so on.

Configurations similar to that shown in FIG. 8b may also be used to dynamically and efficiently move a resource instance 120 from one subnet to another in some embodiments. For example, a customer may have set up an application server instance on a resource instance 120A attached to interface record 170A within a subnet 811A dedicated to a software development environment, and deployed an updated version of an application on the application server instance. If the customer desires to start quality assurance (QA) testing on the updated version, and the QA test environment is in a subnet 811B isolated from the development subnet 811A, the following steps may be taken. First, a second interface record 170C from subnet 811B may be attached to the resource instance 120A. Then the interface record 170A may be detached from the resource instance 120A, thus enabling the testing to be done in the desired QA subnet alone without having to deploy the updated version of the application on a different resource instance. Similarly, applications may be moved easily through other development lifecycle stage transitions, such as from a QA environment to a production environment, and so on.

In one environment, a customer may wish to isolate a set of front-end web servers or other resources accessible from external networks (i.e., devices outside the provider network containing resource instances 120) from a set of back-end servers such as database servers that may store sensitive data, such that direct network access to the back-end servers from external networks is to be prevented. In such a case, the resource instance 120A of FIG. 8b may use subnet 811A for front-end traffic and subnet 811B for back-end traffic in some embodiments. Thus requests for web services may be received via subnet 811A at a web server running on resource instance 120A, and the corresponding back-end requests needed to fulfill those requests may be sent to the back-end servers in subnet 811B. Responses from the back-end servers may be received from subnet 811B and transmitted back to the requesters via subnet 811A.

In some implementations, an instance 120 that is attached to multiple interface records 170 in different subnets may also be used as a router. For example, if a packet received at the resource instance has a source IP address reachable from the resource instance through one subnet, and a destination IP address reachable through another subnet, and the appropriate configuration settings needed are set (e.g., if routing table entries are set up appropriately), the instance may route the packet to the destination address via the second subnet.

Use Case Scenario 3: Attaching to Multiple Logical Partitions of the Same Customer FIG. 8c illustrates a configuration in which two interface records 170A and 170D from different logical partitions 801A and 801B set up for the same customer (Customer A) are associated with a single resource instance 120A, according to one embodiment. The interface record 170A is shown with example IP address 10.0.0.9 within subnet 811A of logical partition 801A and the interface record 170D is shown with IP address 172.16.1.10 within a subnet 811B of a different logical partition 801B. This kind of configuration may be useful for several purposes. The two logical partitions 801A and 801B may have been set up for any of a variety of reasons on behalf of Customer A—e.g., to isolate traffic of Customer A's private intranet from traffic directed to a de-militarized zone (DMZ) network exposed by Customer A to their own customers. In such an environment, the resource instance 120A of FIG. 8c may be configured to perform inter-partition routing, for example. In some embodiments the customer may wish to have the services provided by resource instance 120A accessible from devices in two logical partitions, which may also be enabled by using a configuration similar to that of FIG. 8c.

Of course, some of the other capabilities supported by NIVC 180 discussed in use cases 1 and 2 above may also be extended across logical partition boundaries using the type of configuration illustrated in FIG. 8c. For example multiple IP addresses may be provided for a given resource instance 120 in two different CIDR/16 address ranges, resource instances may be moved across logical partitions, and so on, in various embodiments. A resource instance 120A may also provide proxy services across logical partitions 801, or be used to implement a management network that is in a separate logical partition from a data network in some embodiments.

Use Case Scenario 4: Attaching to Logical Partitions of Different Customers

NIVC 180 may be able to provide a number of bridging services across logical partitions set up for different customers in some embodiments. FIG. 8*d* illustrates a configuration in which two interface records 170A and 170E from different logical partitions 801A and 801B set up for respective customers (partition 801A for Customer A, and partition 801B for Customer B) are associated with a single resource instance 120A, according to one embodiment.

The functionality illustrated in FIG. 8*d* may enable a number of different collaborative scenarios. In one example, Customer A and Customer B may be collaborating on a project. Customer A may have deployed a content server application on a resource instance 120A in their logical partition 801A. Customer B may wish to access that content server application, but neither company may want to expose this server to the public Internet. Instead, Customer B may create an interface record 170E in their own logical partition 801B and set permissions on that interface record 170E allowing Customer A to attach to it. Customer A may attach interface record 170E to the resource instance 120A running the content server in Customer A's logical partition 801A. Thus, both customers may securely access the content server without having to make extensive changes. In addition, Customer A may, using the security properties of interface record 170E, ensure that only HTTP and HTTPS ports are available to Customer B in some implementations, or may limit access from Customer B's logical partition in other ways as desired.

In a second scenario where peering between customers may be enabled, Customers A and B may be collaborating on a number of projects and may like to have private access to each other's logical partitions. Customer A may launch a gateway application (such as a firewall or router) on resource instance 120A and Customer B may create an interface record 170E in one such embodiment. The gateway application owner Customer A may attach the interface record 170E to the resource instance 120A, so that both logical partitions are connected via the dual-homed resource instance 120A running the gateway application. This scenario may place some constraints on the IP address ranges of the two customers' logical partitions—e.g., if they have overlapping IP addresses some form of network address translation may be required in some implementations. In some environments the resource instance 120A may be hosted on a dedicated networking appliance (e.g., a router appliance or a firewall appliance).

Cross-partition attachment capabilities may also be used for providing technical support capabilities in some embodiments. In one such scenario, Customer A may be using an application from Vendor X at resource instance 120A, where Vendor X is also a customer of the operator of system 100. Customer A may have encountered a problem with the application and may like to receive "hands-on" support from Vendor X. Customer A may contact Vendor X, and Vendor X may create an interface record 170E in their own logical partition and give Customer A permission to attach. Customer A may attach their resource instance 120A to Vendor X's interface record 170E so that, for example, Vendor X may use a secure shell (SSH) or the remote desktop protocol (RDP) to access the troubled application and perform troubleshooting as needed. Such support may be supported without using an Internet gateway or virtual private network gateway to access Customer A's logical partition. Furthermore, Customer A may in some embodiments modify the egress policy (e.g., using security properties of interface record 170E) to prevent any traffic from being transmitted from the resource instance 120A to Vendor X's logical partition 801B. This may prevents Vendor X from inadvertently or maliciously accessing other resources in Customer A's logical partition 801A.

Managed service providers (MSPs) may also be able to take advantage of the cross-partition attach capabilities in some embodiments. An MSP (Customer A) may host applications in its own logical partition (e.g., 801A) and attach to interface records 170 in their customers' logical partitions (e.g., partition 801B of MSP Customer B), thus providing the MSP customers with endpoints in their own partitions to access the MSP application. The MSP may maintain control of the resource instances (e.g., 120A) where their applications run, while the MSP customers may be able to access the MSP applications via IP addresses in the MSP customers' network space. MSP applications may include any of a variety of different types of services, such as customer relationship management (CRM), content management, collaboration, databases and the like.

In addition to the examples illustrated in FIGS. 8*a*-8*d*, the capabilities of NIVC 180 may also enable other types of services in various embodiments. For example, when and if a first resource instance 120 attached to an interface record 170 fails or has an outage, a form of high availability (HA) may be implemented by attaching the interface record 170 to a second resource instance capable of providing similar services as the first resource instance. In embodiments where system 100 supports a variety of services, such as a relational database service, map-reduce or other distributed or parallel computing services, deployment services or load balancing services, a resource instance 120 that attaches to multiple customer logical partitions may be used to implement administration and control services for the various services. Such administration services may be referred to as "control plane" capabilities, as distinguished from "data planes" capabilities used for transmitting non-administrative application data or user data.

Example Web Interface

In some embodiments NIVC 180 may be operable to implement one or more interfaces that define and support some or all of the interface record-related services described above. For example, one or more application programming interfaces (APIs) may be implemented, or various types of graphical user interfaces (GUIs) or command-line interfaces may be provided in various implementations. FIG. 9 is an illustration of a portion of an exemplary web-based interface that may be provided by NIVC 180, according to at least some embodiments.

Web page 900 of FIG. 9 includes several form fields that a client 148 may fill out to provide details of an interface record creation request. In area 903 of web page 900, a friendly greeting and overview message may be provided. Form field 904 may allow the client to specify a name and a description for the interface record. In embodiments where logical partitions are implemented, a form field 905 may be provided to allow the client to specify a logical partition for the requested interface record 170. In some implementations, a set of identifiers of the logical partitions from which the client 148 is authorized to select one may be made available automatically, e.g., via a drop-down menu, and/or field 905 may be pre-populated with a default logical partition identifier that the client may modify. Form field 909 may be used to specify a subnet identifier for the interface record. One or more IP addresses (including private and/or public IP addresses) may be specified using form field 917. Form field 921 may be available for specifying various security properties, such as security groups, lists of entities allowed to attach the interface record, and the like. Field 925 may be optionally used to identify a resource instance 120 to which the interface record is to be attached. As in the case of field 905, several of the other fields on web page 900 may also be pre-populated with default values in some implementations, and/or a selection of allowed choices may be provided via a drop-down menu or a similar mechanism. Submit button 931 may be used to submit the interface record creation request.

NIVC 180 may in one implementation generate values for some or all fields that may be left unfilled by the requesting client 148. In some implementations employing a web-based interface, several different web pages may be employed during the process of creating an interface record. As the client fills out one form entry, the NIVC 180 may be able to customize or narrow the set of options available for subsequent form entries. In some implementations the submission of form data via an interface like web page 900 may result in an invocation of one or more API calls that may be supported by NIVC 180.

Interfaces similar to that illustrated in FIG. 9 for creating an interface record 170 may also be provided for the other types of operations supported by NIVC 180 in various embodiments, such as attachment operations, detachment operations, delete operations, IP address change operations, and the like. In some embodiments clients 148 may be allowed to submit queries to, for example, determine the status of interface records 170, identify the interface records 170 attached to a given resource instance 120, list all the interface records set up by the client 148 in a given subnet or logical partition, and so on.

Methods for Interface Record Operations

Figure 10:
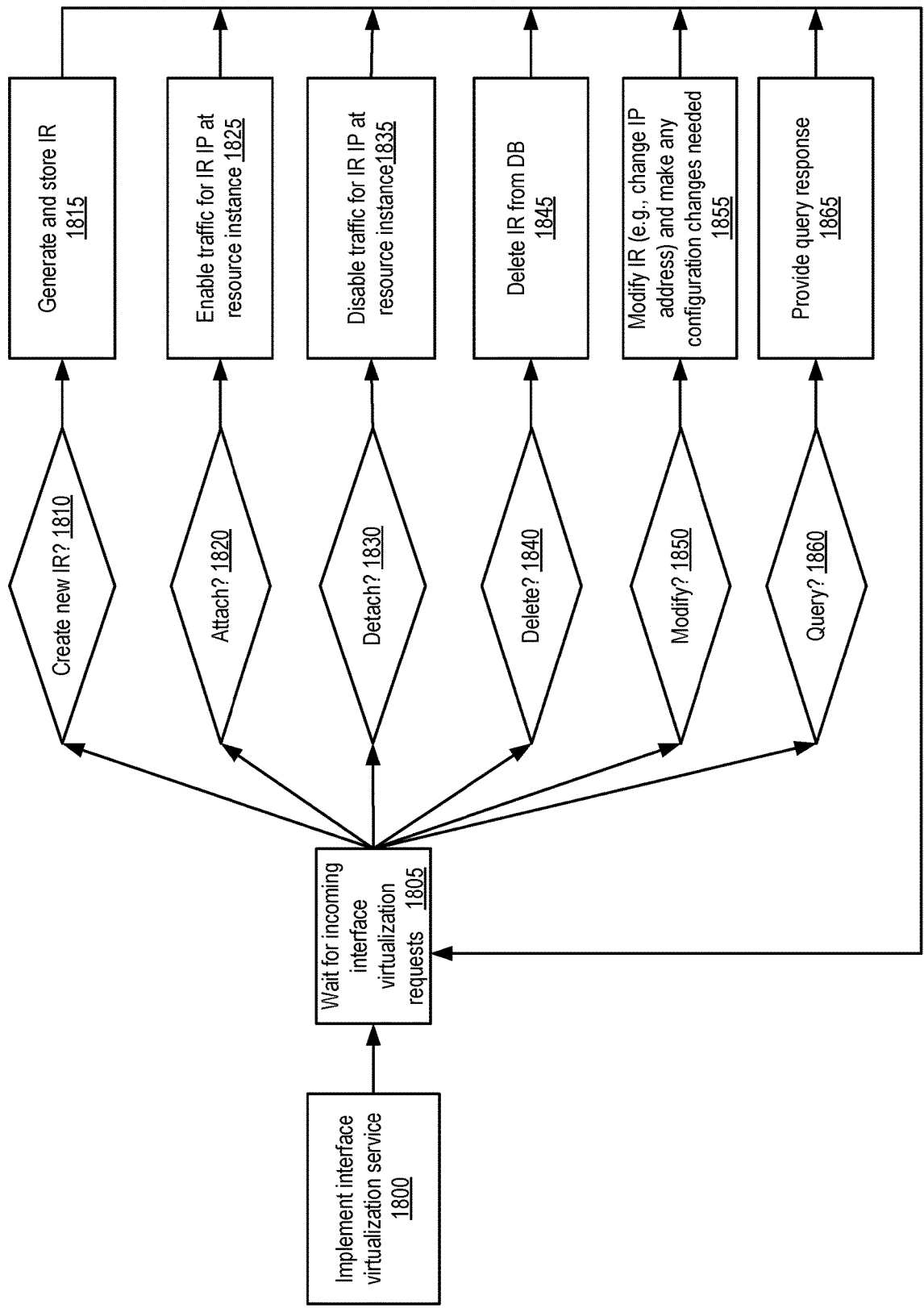
FIG. 10 is a flowchart of a method for providing interface record services, according to at least some embodiments.

FIG. 10 is a flowchart of a method for providing interface record operations, according to at least some embodiments. As shown in element 1800 in the flowchart, an interface virtualization service may be implemented, e.g., in the form of an NIVC 180. In some implementations, the service may be implemented by a combination of software and/or hardware components, for example via components of hypervisor software, operating system software, or routing software that runs on various devices within a provider network. As shown in element 1805, one element of the service may be configured to wait for interface virtualization requests, which may for example be received via a web-based interface similar to that shown in FIG. 10.

Depending on the specific type of request received, the appropriate set of actions may be taken in response. For example, if a request to create a new interface record is received (element 1810 of FIG. 10), such a record 170 may be instantiated and optionally stored in a repository (element 1815). If a request to attach an existing interface record is received (element 1820), traffic flow directed to or from the IP address or addresses specified for the interface record may be enabled at the resource instance 120 to which the attachment is requested (element 1825). If a detach request is received (element 1830), traffic to and from the IP address(es) of the interface record may be disabled (element 1835) at the resource instance to which the interface record was attached. If a request to delete an interface record is received (element 1840), the record may be deleted, e.g., from repository 185 (element 1845).

On receiving a request to modify an interface record (e.g., to change an IP address) (element 1850), the record may be modified as requested, and any needed configuration changes may be initiated (element 1855). On receiving an interface record query (e.g., to determine the status of an interface record or records) (element 1860), the response to the query may be generated and provided (element 1865), In each case, the appropriate authorization and security checks may be performed prior to performing the requested action or actions. In some implementations, some types of interface-record operations may be implemented as idempotent operations, e.g., if a first request to change an IP address to A.B.C.D is received, followed by a second request that requests the same change, the second request may have no effect. If an unexpected, unsupported, unauthorized or otherwise invalid request is received, an error message may be generated in some implementations. After responding to a given request, the service may then wait for the next interface virtualization request. In some implementations, portions of the functionality shown in FIG. 10 may be implemented in parallel, e.g., more than one request may be handled at one time. In some implementations several requests may be combined—e.g., a single request to both create and attach an instance record may be supported.

Illustrative Computer System

Figure 11:
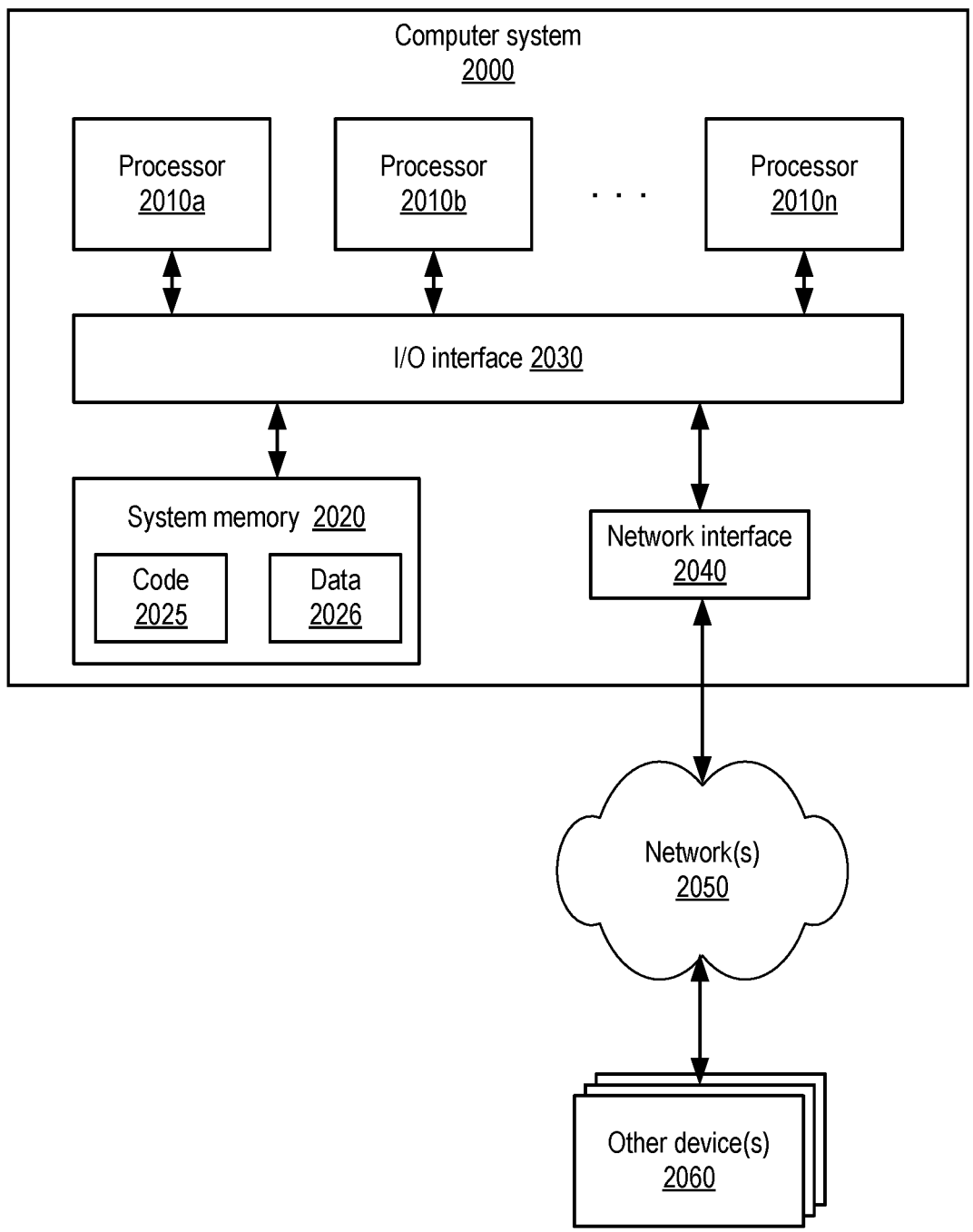
FIG. 11 is a block diagram illustrating an example computer system that may be used in some embodiments.

In at least some embodiments, a server that implements a portion or all of one or more of the technologies described herein, including the techniques to provide various services and operations related to interface records 170, may include a general-purpose computer system that includes or is configured to access one or more computer-accessible media, such as computer system 2000 illustrated in FIG. 11. In the illustrated embodiment, computer system 2000 includes one or more processors 2010 coupled to a system memory 2020 via an input/output (I/O) interface 2030. Computer system 2000 further includes a network interface 2040 coupled to I/O interface 2030.

In various embodiments, computer system 2000 may be a uniprocessor system including one processor 2010, or a multiprocessor system including several processors 2010 (e.g., two, four, eight, or another suitable number). Processors 2010 may be any suitable processors capable of executing instructions. For example, in various embodiments, processors 2010 may be general-purpose or embedded processors implementing any of a variety of instruction set architectures (ISAs), such as the x86, PowerPC, SPARC, or MIPS ISAs, or any other suitable ISA. In multiprocessor systems, each of processors 2010 may commonly, but not necessarily, implement the same ISA.

System memory 2020 may be configured to store instructions and data accessible by processor(s) 2010. In various embodiments, system memory 2020 may be implemented using any suitable memory technology, such as static random access memory (SRAM), synchronous dynamic RAM (SDRAM), nonvolatile/Flash-type memory, or any other type of memory. In the illustrated embodiment, program instructions and data implementing one or more desired functions, such as those methods, techniques, and data described above, are shown stored within system memory 2020 as code 2025 and data 2026.

In one embodiment, I/O interface 2030 may be configured to coordinate I/O traffic between processor 2010, system memory 2020, and any peripheral devices in the device, including network interface 2040 or other peripheral interfaces. In some embodiments, I/O interface 2030 may perform any necessary protocol, timing or other data transformations to convert data signals from one component (e.g., system memory 2020) into a format suitable for use by another component (e.g., processor 2010). In some embodiments, I/O interface 2030 may include support for devices attached through various types of peripheral buses, such as a variant of the Peripheral Component Interconnect (PCI) bus standard or the Universal Serial Bus (USB) standard, for example. In some embodiments, the function of I/O interface 2030 may be split into two or more separate components, such as a north bridge and a south bridge, for example. Also, in some embodiments some or all of the functionality of I/O interface 2030, such as an interface to system memory 2020, may be incorporated directly into processor 2010.

Network interface 2040 may be configured to allow data to be exchanged between computer system 2000 and other devices 2060 attached to a network or networks 2050, such as other computer systems or devices as illustrated in FIGS. 1 through 10, for example. In various embodiments, network interface 2040 may support communication via any suitable wired or wireless general data networks, such as types of Ethernet network, for example. Additionally, network interface 2040 may support communication via telecommunications/telephony networks such as analog voice networks or digital fiber communications networks, via storage area networks such as Fibre Channel SANs, or via any other suitable type of network and/or protocol.

In some embodiments, system memory 2020 may be one embodiment of a computer-accessible medium configured to store program instructions and data as described above for FIGS. 1 through 10 for implementing embodiments of methods and apparatus for virtual network interface records. However, in other embodiments, program instructions and/or data may be received, sent or stored upon different types of computer-accessible media. Generally speaking, a computer-accessible medium may include non-transitory storage media or memory media such as magnetic or optical media, e.g., disk or DVD/CD coupled to computer system 2000 via I/O interface 2030. A non-transitory computer-accessible storage medium may also include any volatile or non-volatile media such as RAM (e.g. SDRAM, DDR SDRAM, RDRAM, SRAM, etc.), ROM, etc, that may be included in some embodiments of computer system 2000 as system memory 2020 or another type of memory. Further, a computer-accessible medium may include transmission media or signals such as electrical, electromagnetic, or digital signals, conveyed via a communication medium such as a network and/or a wireless link, such as may be implemented via network interface 2040. Portions or all of multiple computer systems such as that illustrated in FIG. 11 may be used to implement the described functionality in various embodiments; for example, software components running on a variety of different devices and servers may collaborate to provide the functionality.

Conclusion

Various embodiments may further include receiving, sending or storing instructions and/or data implemented in accordance with the foregoing description upon a computer-accessible medium. Generally speaking, a computer-accessible medium may include storage media or memory media such as magnetic or optical media, e.g., disk or DVD/CD-ROM, volatile or non-volatile media such as RAM (e.g. SDRAM, DDR, RDRAM, SRAM, etc.), ROM, etc, as well as transmission media or signals such as electrical, electromagnetic, or digital signals, conveyed via a communication medium such as network and/or a wireless link.

The various methods as illustrated in the Figures and described herein represent exemplary embodiments of methods. The methods may be implemented in software, hardware, or a combination thereof. The order of method may be changed, and various elements may be added, reordered, combined, omitted, modified, etc.

Various modifications and changes may be made as would be obvious to a person skilled in the art having the benefit of this disclosure. It is intended to embrace all such modifications and changes and, accordingly, the above description to be regarded in an illustrative rather than a restrictive sense.

What is claimed is:

1. A system, comprising:
   a service platform including one or more processors, a memory, and a network interface card;
   wherein the memory includes instructions that upon execution on or across the one or more processors cause the one or more processors to:
     obtain, from an interface virtualization coordinator of a provider network, respective indications of (a) a first interface record comprising a first network address and (b) a second interface record comprising a second network address;
     cause network traffic obtained via the network interface card and directed to the first network address to be received at a first resource instance established at the service platform, wherein the first interface record is attached to the first resource instance such that the first network address of the first interface record is associated with the first resource instance; and
     cause network traffic obtained via the network interface card and directed to the second network address to be received at a second resource instance established at the service platform, wherein the second interface record is attached to the second resource instance such that the second network address of the second interface record is associated with the second resource instance.

2. The system as recited in claim 1, wherein the memory includes further instructions that upon execution on or across the one or more processors further cause the one or more processors to:
   obtain, from the interface virtualization coordinator of the provider network, an indication of a third interface record comprising a third network address; and
   cause network traffic obtained via the network interface card and directed to the third network address to be received at the first resource instance, wherein the third interface record is attached to the first resource instance such that the third network address of the third interface record is associated with the first resource instance.

3. The system as recited in claim 1, wherein the memory includes further instructions that upon execution on or across the one or more processors further cause the one or more processors to:
   apply a security rule associated with the first interface record to the traffic directed to the first network address, wherein the security rule is indicated via a programmatic interface, and wherein the security rule indicates one or more of: (a) a port restriction or (b) a protocol restriction.

4. The system as recited in claim 1, wherein the first interface record comprises a third network address, and wherein the memory includes further instructions that upon execution on or across the one or more processors further cause the one or more processors to:
   cause network traffic obtained via the network interface card and directed to the third network address to be received at the first resource instance.

5. The system as recited in claim 1, wherein the memory includes further instructions that upon execution on or across the one or more processors further cause the one or more processors to:

in response to (a) a programmatic detachment of the first interface record from the first resource instance and (b) a programmatic attachment of the first interface record to a third resource instance established at the resource platform, cause network traffic obtained via the network interface card and directed to the first network address to be received at the third resource instance.

6. The system as recited in claim 1, wherein the first network address is part of a first subnet, and wherein the first interface record comprises a subnet identifier of the first subnet.

7. The system as recited in claim 1, wherein the service platform is configured within the provider network, wherein the first network address is not accessible from outside the provider network, and wherein the second network address is accessible from outside the provider network.

8. A method, comprising:

performing, at one or more computing devices:

obtaining, at a service platform, from an interface virtualization coordinator of a provider network, respective indications of (a) a first interface record comprising a first network address and (b) a second interface record comprising a second network address;

causing network traffic which is (a) obtained via a network interface card of the service platform and (b) directed to the first network address to be received at a first resource instance established at the service platform, wherein the first interface record is attached to the first resource instance such that the first network address of the first interface record is associated with the first resource instance; and causing network traffic which is (b) obtained via the network interface card and (b) directed to the second network address to be received at a second resource instance established at the service platform, wherein the second interface record is attached to the second resource instance such that the second network address of the second interface record is associated with the second resource instance.

9. The method as recited in claim 8, further comprising performing, at the one or more computing devices:

obtaining, from the interface virtualization coordinator of the provider network, an indication of a third interface record comprising a third network address; and causing network traffic obtained via the network interface card and directed to the third network address to be received at the first resource instance, wherein the third interface record is attached to the first resource instance such that the third network address of the third interface record is associated with the first resource instance.

10. The method as recited in claim 8, further comprising performing, at the one or more computing devices:

applying a security rule associated with the first interface record to the traffic directed to the first network address, wherein the security rule is indicated via a programmatic interface, and wherein the security rule indicates one or more of: (a) a port restriction or (b) a protocol restriction.

11. The method as recited in claim 8, wherein the first interface record comprises a third network address, the method further comprising performing, at the one or more computing devices:

causing network traffic obtained via the network interface card and directed to the third network address to be received at the first resource instance.

12. The method as recited in claim 8, further comprising performing, at the one or more computing devices:

in response to (a) a programmatic detachment of the first interface record from the first resource instance and (b) a programmatic attachment of the first interface record to a third resource instance established at the resource platform, causing network traffic obtained via the network interface card and directed to the first network address to be received at the third resource instance.

13. The method as recited in claim 8, wherein the first network address is part of a first subnet, and wherein the first interface record comprises a subnet identifier of the first subnet.

14. One or more non-transitory computer-accessible storage media storing program instructions that when executed on or across one or more processors cause one or more computer systems to:

obtain, at a service platform from an interface virtualization coordinator of a provider network, respective indications of (a) a first interface record comprising a first network address and (b) a second interface record comprising a second network address such that the first network address of the first interface record is associated with the first resource instance;

cause network traffic which is (a) obtained via a network interface card of the service platform and (b) directed to the first network address to be received at a first resource instance established at the service platform, wherein the first interface record is attached to the first resource instance; and cause network traffic which is (a) obtained via the network interface card and (b) directed to the second network address to be received at a second resource instance established at the service platform, wherein the second interface record is attached to the second resource instance such that the second network address of the second interface record is associated with the second resource instance.

15. The one or more non-transitory computer-accessible storage media as recited in claim 14, storing further program instructions that when executed on or across the one or more processors further cause the one or more computer systems to:

obtain, from the interface virtualization coordinator of the provider network, an indication of a third interface record comprising a third network address; and cause network traffic obtained via the network interface card and directed to the third network address to be received at the first resource instance, wherein the third interface record is attached to the first resource instance such that the third network address of the third interface record is associated with the first resource instance.

16. The one or more non-transitory computer-accessible storage media as recited in claim 14, storing further program instructions that when executed on or across the one or more processors further cause the one or more computer systems to:

implement, with respect to the traffic directed to the first network address, a security rule associated with the first interface record, wherein the security rule is indicated via a programmatic interface, and wherein the security rule indicates one or more of: (a) a port restriction or (b) a protocol restriction.

17. The one or more non-transitory computer-accessible storage media as recited in claim 14, storing further program instructions that when executed on or across the one or more processors further cause the one or more computer systems to:

cause network traffic obtained via the network interface card and directed to a third network address to be received at the first resource instance, wherein the first interface record comprises the third network address.

18. The one or more non-transitory computer-accessible storage media as recited in claim 14, storing further program instructions that when executed on or across the one or more processors further cause the one or more computer systems to:

in response to (a) a programmatic detachment of the first interface record from the first resource instance and (b) a programmatic attachment of the first interface record to a third resource instance established at the resource platform, cause network traffic obtained via the network interface card and directed to the first network address to be received at the third resource instance.

19. The one or more non-transitory computer-accessible storage media as recited in claim 14, wherein the first resource instance comprises virtualized storage.

* * * * *